US010614457B2

(12) United States Patent
Carrott

(10) Patent No.: US 10,614,457 B2
(45) Date of Patent: *Apr. 7, 2020

(54) SECURE AUTHORIZATIONS USING INDEPENDENT COMMUNICATIONS AND DIFFERENT ONE-TIME-USE ENCRYPTION KEYS FOR EACH PARTY TO A TRANSACTION

(71) Applicant: BenedorTSE LLC, Dover, DE (US)

(72) Inventor: Richard F. Carrott, Tallahassee, FL (US)

(73) Assignee: BenedorTSE LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/419,148

(22) Filed: May 22, 2019

(65) Prior Publication Data

US 2019/0295074 A1    Sep. 26, 2019

Related U.S. Application Data

(63) Continuation of application No. 15/381,465, filed on Dec. 16, 2016, now Pat. No. 10,311,433, which is a
(Continued)

(51) Int. Cl.
*G06Q 20/38* (2012.01)
*G06Q 20/40* (2012.01)
(Continued)

(52) U.S. Cl.
CPC ....... *G06Q 20/3829* (2013.01); *G06Q 20/202* (2013.01); *G06Q 20/3674* (2013.01);
(Continued)

(58) Field of Classification Search
CPC ...... G06Q 20/385; G06Q 20/04; G06Q 20/40; G06Q 20/32; G06Q 20/382;
(Continued)

(56) References Cited

U.S. PATENT DOCUMENTS

| 5,398,285 A | 3/1995 | Borgelt et al. |
| 5,809,160 A | 9/1998 | Powell et al. |

(Continued)

FOREIGN PATENT DOCUMENTS

| CA | 2 892 457 A1 | 5/2016 |
| WO | 9840809 A2 | 9/1998 |

(Continued)

OTHER PUBLICATIONS

Visa: Visa Electronic Wallet Service for Secure Internet Payment Available for European Member Banks; Card Issuers can Participate in 3D-Set at an Entry Price of US $50,000, M2 Presswire [Coventry] Oct. 24, 2000: 1, pp. 1-3.
(Continued)

*Primary Examiner* — Thien M Le
*Assistant Examiner* — Tae W Kim
(74) *Attorney, Agent, or Firm* — Gibb & Riley, LLC

(57) ABSTRACT

A registered provider device encrypts provider input related to a transaction between the provider device and one of many registered user devices to create an encrypted one-time-use provider code (the encryption is performed using an encryption key produced, in part, using a uniquely sequenced number generated by a sequencer maintained by the provider device). Similarly, the user device encrypts user input to create an encrypted one-time-use user code using an encryption key produced, in part, using a uniquely sequenced number generated by a user sequencer maintained by the user device. The provider and user devices independently transmit their different encrypted one-time-use codes to an intermediate entity, which decrypts the encrypted codes. This decryption is performed using one-time-use encryption keys produced using sequencers maintained by the intermediate entity, and this decryption generates an authorization request. The intermediate entity obtains an authorization decision regarding the authorization request from the authorization entity.

20 Claims, 18 Drawing Sheets

Related U.S. Application Data continuation of application No. 15/045,936, filed on Feb. 17, 2016, now Pat. No. 9,558,493, which is a continuation-in-part of application No. 14/930,023, filed on Nov. 2, 2015, now Pat. No. 9,558,492, which is a continuation-in-part of application No. 14/539,190, filed on Nov. 12, 2014, now Pat. No. 9,569,776.

(51) Int. Cl.
  *G06Q 20/36* (2012.01)
  *G06Q 20/20* (2012.01)
  *H04W 12/04* (2009.01)
  *H04L 9/32* (2006.01)

(52) U.S. Cl.
  CPC ......... *G06Q 20/382* (2013.01); *G06Q 20/385* (2013.01); *G06Q 20/40* (2013.01); *H04L 9/3228* (2013.01); *H04W 12/04* (2013.01); *G06Q 2220/00* (2013.01); *H04L 2209/56* (2013.01)

(58) Field of Classification Search
  CPC .. G06Q 20/4014; G06Q 20/425; G06Q 30/06; G06Q 20/02; G06Q 20/10; G06Q 20/102; G06Q 20/108; G06Q 20/322; G06Q 20/3223; G06Q 20/3226; G06Q 20/3227; G06Q 20/3229; G06Q 20/3278; G06Q 20/3552; G06Q 20/367; G06Q 20/3674; G06Q 20/3821; G06Q 20/3829; G06Q 20/401; G06Q 30/0238; G06Q 40/00; H04L 2209/56; H04L 2463/062; H04L 63/0838; H04L 9/3228; H04L 9/3271; H04L 2209/76; H04L 2209/80; H04L 63/0428; H04L 63/102; H04L 63/14; H04L 63/1441; H04L 63/1466; H04L 9/0822; H04L 9/321; H04L 9/3247; G06F 21/31; G06F 21/335; G06F 2221/2103; G07C 9/00071; H04B 5/0031; H04W 12/06; H04W 12/08; H04W 4/80; H04W 88/06
  USPC ....................................................... 235/379
  See application file for complete search history.

(56) References Cited

U.S. PATENT DOCUMENTS

| | | | |
|---|---|---|---|
| 5,857,021 A | 1/1999 | Kataoka et al. | |
| 5,892,900 A | 4/1999 | Ginter et al. | |
| 5,903,721 A | 5/1999 | Sixtus | |
| 6,000,832 A | 12/1999 | Franklin et al. | |
| 6,078,902 A | 6/2000 | Schenkler | |
| 6,119,946 A | 9/2000 | Teicher | |
| 6,418,472 B1 | 7/2002 | Mi et al. | |
| 6,512,840 B1 | 1/2003 | Tognazzini | |
| 6,618,705 B1 | 9/2003 | Wang et al. | |
| 6,839,692 B2 | 1/2005 | Carrott et al. | |
| 7,051,002 B2 | 5/2006 | Keresman, III et al. | |
| 7,140,036 B2 | 11/2006 | Bhagavatula et al. | |
| 7,292,996 B2 | 11/2007 | Nobrega et al. | |
| 7,386,516 B2 | 6/2008 | Turgeon | |
| 7,584,886 B2 | 9/2009 | Labaton | |
| 8,412,626 B2 | 4/2013 | Hirson et al. | |
| 8,423,466 B2 | 4/2013 | Lanc | |
| 8,565,723 B2 | 10/2013 | Cox | |
| 8,655,789 B2 | 2/2014 | Bishop et al. | |
| 2003/0028481 A1 | 2/2003 | Flitcroft et al. | |
| 2003/0200162 A1* | 10/2003 | Challener | G06Q 20/02 705/35 |
| 2003/0212632 A1 | 11/2003 | Keogh et al. | |
| 2004/0199469 A1* | 10/2004 | Barillova | G06Q 20/04 705/44 |
| 2007/0288394 A1 | 12/2007 | Carrott | |
| 2008/0208762 A1 | 8/2008 | Arthur et al. | |
| 2008/0222046 A1 | 9/2008 | McIsaac et al. | |
| 2008/0319914 A1 | 12/2008 | Carrott | |
| 2009/0124234 A1* | 5/2009 | Fisher | G06Q 20/32 455/406 |
| 2010/0106649 A1 | 4/2010 | Annan | |
| 2011/0276495 A1* | 11/2011 | Varadarajan | G06F 21/31 705/71 |
| 2012/0011066 A1 | 1/2012 | Telle et al. | |
| 2012/0150671 A1 | 6/2012 | Mercia et al. | |
| 2012/0324233 A1 | 12/2012 | Nguyen et al. | |
| 2014/0304095 A1 | 10/2014 | Fisher | |

FOREIGN PATENT DOCUMENTS

| | | |
|---|---|---|
| WO | 0152212 A1 | 7/2001 |
| WO | 2009031159 A2 | 3/2009 |

OTHER PUBLICATIONS

EBay's Latest Retail Technologies Demonstrations (The Future of Commerce) Morning Session—Final Fair Disclosure Wire [Waltham], ProQuest, Mar. 20, 2012, pp. 1-12.
Qiong Liu et al., "Digital Rights Management for Content Distribution", School of Informatics Technology and Computer Science, University of Wollongong, Northfields Ave, Wollongong, NSW 2522, Australia, 2003, pp. 1-10.
Office Action Communication, U.S. Appl. No. 14/930,023, dated Jan. 25, 2016, pp. 1-21.
International Application No. PCT/US2015/027731, PCT Notification of Transmittal of The International Search Report and Written Opinion, dated Jan. 21, 2016, pp. 1-12.
Office Action Communication, U.S. Appl. No. 14/539,190, dated Feb. 16, 2016, pp. 1-17.
PCT Notification of Transmittal of the International Search Report and the Written Opinion of the International Searching Authority, International Application No. PCT/US2016/018253, dated Nov. 7, 2016, pp. 1-14.
D. M'Raihi et al., "HOTP: An HMAC-Based One-Time Password Algorithm", JCT-VC Meeting; 96. Dec. 2005, pp. 1-20.
Notice of Allowance, U.S. Appl. No. 14/539,190, dated Oct. 7, 2016, pp. 1-20.
Notice of Allowance, U.S. Appl. No. 15/045,936, dated Oct. 19, 2016, pp. 1-25.
Notice of Allowance, U.S. Appl. No. 14/930,023, dated Oct. 14, 2016, pp. 1-19.
Office Action Communication, U.S. Appl. No. 14/539,190, dated Jul. 15, 2016, pp. 1-21.
Office Action Communication, U.S. Appl. No. 15/045,936, dated Jul. 29, 2016, pp. 1-29.
PCT Notification of Transmittal of the International Search Report and Written Opinion of the International Searching Authority, International Application No. PCT/US2015/062827, dated Aug. 30, 2016, pp. 1-13.
International Application No. PCT/US2015/062827, International Preliminary Report on Patentability and Written Opinion dated Nov. 9, 2017, pp. 1-10.
International Application No. PCT/US2016/018253, International Preliminary Report on Patentability and Written Opinion dated Nov. 9, 2017, pp. 1-9.
International Application No. PCT/US2015/027731, International Preliminary Report on Patentability, dated May 26, 2017, pp. 1-9.
Office Action Communication, U.S. Appl. No. 14/930,023, dated Jul. 15, 2016, pp. 1-22.
Notice of Allowance, U.S. Appl. No. 15/381,465, dated Jan. 17, 2019, pp. 1-21.

\* cited by examiner account
- 🔑 id INT
- ◇ name VARCHAR(45)
- ◇ billing_address_id VARCHAR(45)
- ◇ etc VARCHAR(45)

Indexes ▷

FIG. 7 account_device
- 🔑 account_id INT
- ◇ device_id INT
- ◇ account_devicecol VARCHAR(45)
- ◇ sequencer VARCHAR(45)
- ◇ salt VARCHAR(45)
- ◇ pepper VARCHAR(45)

Indexes ▷

FIG. 8

SECURE AUTHORIZATIONS USING INDEPENDENT COMMUNICATIONS AND DIFFERENT ONE-TIME-USE ENCRYPTION KEYS FOR EACH PARTY TO A TRANSACTION

CROSS-REFERENCE TO RELATED APPLICATIONS

The present invention claims the benefit under 35 U.S.C. § 120 as a Continuation of U.S. patent application Ser. No. 15/381,465 filed on Dec. 16, 2016, now issued as U.S. Pat. No. 10,311,433 on Jun. 10, 2019, U.S. Pat. No. 9,558,493 issued on Jan. 31, 2017, U.S. Pat. No. 9,558,492 issued on Jan. 31, 2017, and U.S. Pat. No. 9,569,776 issued on Feb. 14, 2017, the entire teachings of which are incorporated herein by reference.

BACKGROUND

Systems and methods herein generally relate to cryptography and security, and more particularly, to secure authorizations using independent communications and different one-time-use encryption keys for each party to a transaction.

Transactions in cyberspace are commonplace, but they are not always secure. There is an old oil industry adage: "To be successful, you need to control either the pipelines or the product." In cyberspace, the products are flowing, but the pipelines are leaking. To date, the risk is getting information securely from point A to point B and requiring it to be stored securely at all points; however, this does not address the real transactional or security issues.

The desire to secure and finalize transactions in cyberspace—both payment and non-payment transactions—is an issue that impacts everyone. Government agencies and security experts are encouraging users to use more sophisticated (i.e., "more complicated") passwords, to not use the same password for different sites, and to change all passwords on a regular basis. This stops short, however, of fixing the problem because passwords identify a user, not the person. And, most of what is being proposed is "mitigation"—extra steps (and related costs) intended to make payment and non-payment transactions in cyberspace "more secure;" however, breaches in security still occur, adding tremendous costs for all parties involved without actually securing or finalizing the transactions.

Transactions in cyberspace (cyber-transactions) can be divided into two basic types: those involving payments through a bank or payment network ("cyber-payment transactions") and those that do not necessarily involve payments through a bank or payment network payment ("non-payment cyber-transactions"). Cybersecurity, or the lack of it, is a problem, and the threats posed by this problem are both real and pervasive, so much so, that the lack of cybersecurity has become a form of accepted "toll" that all organizations and individuals must pay for accessing the information highway.

The inability to actually identify the parties to transactions in cyberspace and provide those parties with tools to actually bind each other to such transactions is at the root of the problem. Merchants experience this every time they are faced with a bank chargeback for a CNP ("card not present") transaction where the cardholder has denied the charge. Whether this is the result of fraud, friendly-fraud, or the result of a hacked system, is not the greatest issue. The issue is that someone has to pay; and, more times than not, that someone is the merchant, because the terms of the merchant's agreement for the acceptance of payment cards for transactions includes the cardholder being present and signing on the receipt. Without this signature, the merchant is liable for the transaction. The same holds true for non-purchase transactions. An intrusion by a non-verified, non-authorized person can be costly; and, someone has to pay the costs.

The problems that cyber-transactions present go well beyond signatures, and identity verifications, however. In general, for a transaction to be valid, certain conditions are established. As a general rule, these include the parities to a transaction being actually identified; their presence during the transaction being actually established; their agreement to and understanding of the transaction (a classic reason for a valid signature) being actually established; and the parties' agreement to be bound by the terms of the agreement/transaction (e.g., by a valid signature). As the history of cyberspace has demonstrated, failure to accomplish any of these steps has potential consequences, generating higher risks and adding costs.

SUMMARY

Exemplary methods herein limit access to Internet of Things (IoT) devices by maintaining owner identification information in an IoT device and a remote registration server. The owner identification information identifies at least one user associated with the IoT device. The IoT device is connected to the remote registration server over a computerized network. With such methods, the IoT device receives an initial request to access the IoT device, and the IoT device transmits the initial request to the remote registration server.

Additionally, the IoT device generates "IoT encryption key data" (independently of the remote registration server) by retrieving at least a portion of the IoT encryption key data from an IoT sequencer. The IoT sequencer comprises a component of the IoT device. Similarly, the remote registration server generates "remote registration server encryption key data" (independently of the IoT device) by retrieving at least a portion of the remote registration server encryption key data from a remote registration server sequencer. The remote registration server sequencer similarly comprises a component of the remote registration server. The IoT sequencer and the remote registration server generate different encryption key data values from each other, and the IoT sequencer and the remote registration server generate different encryption key data values each time the IoT sequencer and the remote registration server are requested to generate the encryption key data values.

With these methods, the IoT device encrypts the owner identification information and data of the initial request (independently of the remote registration server) to create an "encrypted one-time-use IoT access code" by first combining at least a portion of the owner identification information and the data of the initial request, and then applying the IoT encryption key data through a data encryption process to the owner identification information and the data of the initial request. Similarly, the remote registration server encrypts the owner identification information and the data of the initial request (independently of the IoT device) to create an "encrypted one-time-use remote registration server access code" by first combining at least a portion of the owner identification information and the data of the initial request, and then applying the remote registration server encryption key data through a data encryption process to the owner identification information and the data of said initial request.

The IoT device transmits the encrypted one-time-use IoT access code to a remote access control server over the computerized network as a first half of an encrypted access request. Similarly the remote registration server transmits the encrypted one-time-use remote registration server access code to the remote access control server over the computerized network as a second half of the encrypted access request. Thus, the IoT device transmits the encrypted one-time-use IoT access code to the remote access control server independently and separately of the remote registration server transmitting the encrypted one-time-use remote registration server access code to the remote access control server, such that the IoT device and the remote registration server independently and separately transmit different halfs of a single encrypted access request to the remote access control server.

The remote access control server decrypts the different halfs of this single encrypted access request by independently generating the IoT encryption key data (by retrieving at least a portion of the IoT encryption key data from a duplicate IoT sequencer, where the duplicate IoT sequencer comprises a component of the remote access control server) and by applying the IoT encryption key data through a data decryption process to the encrypted one-time-use IoT access code to produce the previously encrypted portion of the owner identification information and the data of the initial request. Similarly, the remote access control server independently generates the remote registration server encryption key data (by retrieving at least a portion of the remote registration server encryption key data from a duplicate remote registration server sequencer, where the duplicate remote registration server sequencer comprises a component of the remote access control server) and by applying the remote registration server encryption key data through a data decryption process to the encrypted one-time-use remote registration server access code to produce the previously encrypted portion of the owner identification information and the data of the initial request.

After performing the above decryption, the remote access control server compares the portion of the owner identification information and the data of the initial request, decrypted from the encrypted one-time-use IoT access code and from the encrypted one-time-use remote registration server access code. The remote access control server identifying whether the encrypted one-time-use IoT access code and the encrypted one-time-use remote registration server access code are matching codes if the portion of the owner identification information and the data of the initial request are consistent.

When there are such matching codes, the remote access control server compares the data of the initial request to data of allowable requests, maintained by the remote access control server, to determine if the initial request is approved or disapproved (e.g., by matching the initial request to an allowable request in the data of allowable requests). Further, the remote access control server transmits whether the initial request is approved or disapproved to the IoT device. The IoT device therefore allows or denies access based on whether the initial request is approved or disapproved.

These and other features are described in, or are apparent from, the following detailed description.

BRIEF DESCRIPTION OF THE DRAWINGS

Various exemplary systems and methods are described in detail below, with reference to the attached drawing figures, in which:

FIG. 7 is a schematic diagram illustrating examples of accounts herein;
FIG. 8 is a schematic diagram illustrating examples of accounts herein.

DETAILED DESCRIPTION

Figure 1:
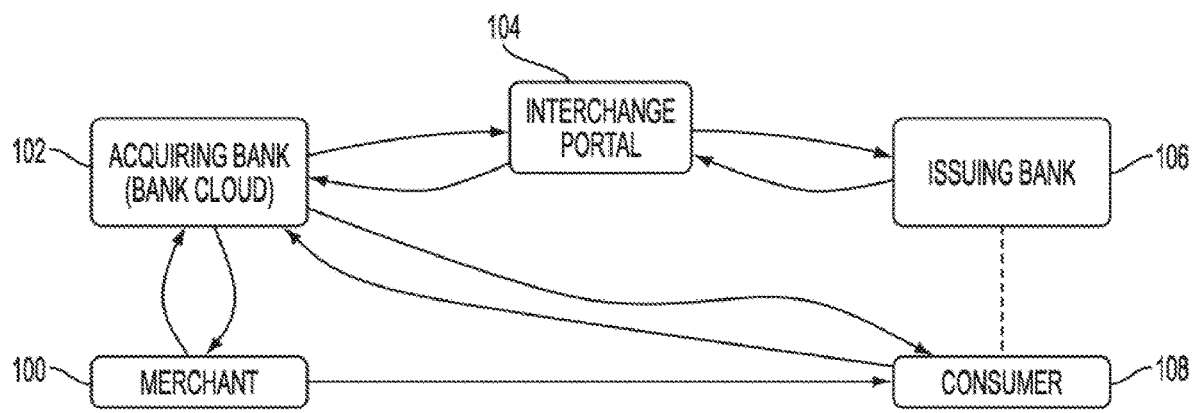
FIG. 1 is a schematic diagram illustrating systems used herein.

There are a number of fundamental and technical problems with security in existing transactional systems in cyberspace or other similar wide area networks. For example, identifying the parties to a transaction, or even confirming the actual website, is, at best, difficult. To protect itself, a site operator ("provider") tries to get as much information as possible about the potential "user"—information that can be referenced if the person returns to the site.

In a purchase transaction, an individual may have more than one payment card they use. Each time the user uses any payment card, the provider is required to "securely" maintain a record of the transaction, as are each of the six, or more, entities that may have a hand in processing each transaction. This is a real problem because too many people are being required to store too much information; and that makes everyone and every transaction vulnerable. What would be useful in cyberspace is a system in which each party to a transaction (payment or non-payment) can actually be verified, with each verified party agreeing to be responsible for their role in each transaction. Then, the verifiable record of each such transaction, and only the transaction record would be stored. Ideally, the transaction should operate over existing transaction networks without additional cost to users or to providers; and, the transaction verifier should be a regulated entity, capable of instilling trust and confidence, and should be the only party storing records of each transaction, as a security matter. Such a transaction secure environment ("TSE") is disclosed herein.

The methods and systems herein utilize many different features. One of these features is a one-time-use code ("OTUC"), generated by a program application ("app") that is designed to verify the identity of each party to a transaction and to act as each party's electronic signature, allowing them to instruct the acquiring bank to finalize each transaction and hold the instructing party (a registered customer of the acquiring bank) responsible for their role in such a TSE transaction. As used herein an "app" or "application" is a self-contained, software engine or instructions to a processor designed to fulfill a particular purpose, such as to generate a unique "sequencer" (i.e., value) and to use that sequencer to encrypt transactional or authorization data, together with provider or user information that allows an intermediate entity to finalize a transaction, into a one-time-use code (using the sequencer as the unique encryption key).

The app transforms the identifiers for all elements of each transaction into a unique code (the OTUC) for each transaction. Another feature is a synchronized symmetric-key encryption element for automatically transforming, or encrypting, each transaction for decryption and verification by, for example, a program bank or other verification entity. This intermediate entity can be a single bank, or a consortium of banks with an open charter (singularly or collectively, and sometimes referred to herein as "bank" for simplicity of illustration), or a separate intermediate entity that operates as, or similar to an acquiring bank during program-secure cyber-transactions, such as credit card transactions, recognizing the customer relationship of issuing banks.

An additional element is the utilization of a platform or cloud environment. For example, the network infrastructure established for payment transactions provides a basis for a rational solution to the securitization problems common to cyber-transactions. This existing structure is useful because banks are already experienced with payment networks and are also experienced with the ability to secure and verifying cyber-transactions.

The methods and systems herein work with transaction flows for processing both payment and nonpayment transactions. The securitization begins with each party registering and remaining in good standing, with the bank. For example, a hospital using the methods and systems herein to ensure records are accessed only by authorized parties with pre-established and currently valid permissions, could enroll for payments element of the OTUC, if they wanted to ensure secure payment transactions with vendors.

More specifically, with methods and systems herein, program registration involves any user (e.g., a customer, an employee, or any other individual or other entity seeking access to a product or service, or any other entity seeking qualified, approved access, etc.) or provider (e.g., any provider of products or services for which authorized access and a secure transactional environment may prove beneficial; e.g., a merchant, government agency, site operator, etc.) seeking to join the program simply registers for a program account with the bank. This registration includes verifying all of the information the bank is required to confirm under the mandatory Know-Your-Customer ("KYC") requirements, as originally specified under the Patriot Act of 2001. This involves taking advantage of the KYC requirement to verify the identity of individuals wishing to conduct financial transactions and conforming the related processes to the bank's customer identification program ("CIP").

The registration also allows for the registration of all existing user payment programs, including all existing payment card programs a user may wish to use or accept under the program. In each case, it is not necessary for a user or provider to obtain or apply for a new payment card account or program. Existing card and payment programs, of the user's choice, may be registered. The CIP process, however, ensures that the bank has verified who their customer is on "day-one" of the program (including existing customers), something the OTUC ensures thereafter. While the program supports both purchase and non-purchase transactions, registration is made of all existing payment programs that a user may wish to use under the program. These existing payment programs are the basis of the user's electronic-wallet ("eWallet") account with the bank.

The apps, which operate on the user and provider devices are responsible for generating a multi-factor authenticator for each transaction and, also, provide the unique OTUC for the bank to finalize the program steps of each transaction. This involves the bank pairing user identifiers (e.g., elements of name, address, social security or business ID number, etc.) with identifiers from the user's transactional device (e.g., mobile phone, personal/business computer, iPad, etc.) then adding a sequencer, which is responsible for uniquely changing the value and nature of each transaction code with each use. The combination of these identifiers, paired with the sequencer, creates a unique OTUC at the beginning of each transaction and also serves, by form and by agreement of the parties, as each party's electronic signature (see, ESIGN Act of 2000) for each transaction. Functionally, the user downloads the app from the bank and loads it onto his/her device. Because the device's identifiers are an integral part of the one-time-use code, a separate app is downloaded for each device, providing the transformation tool to implement the claimed steps. A similarly structured OTUC is generated for each program provider, allowing the bank or other intermediate, under agreement with and instruction from each party, to bind each party to each transaction, recording each party's eSignature to the record of each transaction, which is maintained by the bank.

Methods and systems herein provide abilities to identify, uniquely, each party to each transaction in an automated, timely, secure, and simple manner. Because each user's and provider's individual device sequencer changes with each use, the sequencer also provides a secure coding element, or encryption key, for packaging the transaction and identifier elements. Also, because the OTUC only uses "elements" of a user's or a provider's identifiers, those identifiers/values must match exactly to the files from which they were selected by the intermediate entity or bank. This is a security element for use in cyber-transactions, with the actual verification of each transaction occurring behind the intermediate entity's firewall, using information that can only be accessed in the presence of a legitimate one-time-use code, and then, only once.

However, as hackers continue to grow in terms of their creativity and sophistication, methods and systems herein include a second level of automated securitization. As the one-time-use code is generated, most of the elements of the transaction are automatically encrypted, using symmetric-key encryption. Left unencrypted are the transaction identifier and the user's account identifier.

Once a user has enrolled and been approved, they download the program application ("user app") from the bank. Providers, after enrollment, download the bank's application programming interface (API) that provides the secure linkage to the bank's platform for program transactions. The API includes a provider app that generates the provider's one-time-use code, which, combined with the user's one-time-use code, gives the bank the tools to uniquely verify the provider's and the user's identity and presence during each transaction.

With payment transactions, a customer ("user") may wish to make a payment for a product or service to a vendor ("provider") from a branded card (e.g., Visa® or MasterCard®); however, paying with such a card generally exposes the user's personal and payment information, either during the transaction, itself, or at later point as a result of a breach at one of the points/nodes of the process where transaction records may be stored and maintained (including the provider's servers). The payment process used to begin with the swiping of the card and signing the receipt. Today, it can begin with a remotely transmitted signal in cyberspace. This results in what is termed a card-not-present ("CNP") transaction. A CNP transaction adds risks to the vendor and the transaction, because cyberspace takes away an ability to verify the presences of the purchaser/user or the vendor/provider and to actually verify the receipt of the goods or services. This increases costs, which includes adding a higher risk of fraud.

Using the methods and systems herein to conduct a transaction means that no personal or private information is actually exchanged, changing the state of the transaction in cyberspace. Once a registered user determines to initiate a transaction at a registered provider's physical or virtual site, that user simply initiates their purchase or non-purchase transaction. When the user is ready to conclude their transaction, they initiate the checkout, or transaction finalization step, the user opens the user app on their device, which prompts the provider to supply a transaction total, if any, and a transaction identification number. The user causes the transaction identification number and the transaction amount, if any, to be entered into the user app. The provider does the same.

The provider and the user then use their respective apps to independently send their half of the transaction to the bank by entering their separate PINs into the app on their separate devices, authorizing their part of the transaction and advising the bank to pair the transaction authorizations, using the transaction identification number and to finalize the entire transaction, recording the each party's authorization and electronic signature. This is done without the provider and user further communicating with each other.

The bank combines the two-halves of the transaction to form a single request for authorization. The acquiring bank reformats the request for authorization of a non-CNP transaction, based upon the bank's verification, as an authorized acquiring bank and according to the bank's independent verification of each party's presence, each party's signature and agreement as to the terms of the agreement, and the bank's verification of the user's payment card, if applicable, according the requirements of the payment network (e.g., Visa® or MasterCard®). If applicable, the bank, then, submits the transaction to the appropriate payment network/gateway as a verified, "signature present" transaction. The payment network routes the request to the issuing bank. The issuing bank either approves or declines the authorization, generally based upon "available funds," and passes the decision back to the payment network. The result (approve/decline) is relayed to the provider and the user and the transaction is concluded, with a transaction receipt sent to each party by the bank. The bank also provides a transaction summary statement to each party at the end of each transaction cycle.

Unlike conventional payment transactions, the provider (e.g., vendor or merchant) is not required store, maintain and secure any personal information of the user (e.g., name, address, credit card number, etc.) and, instead only receives an indication from the user of a desire to pay for an item using the methods and systems herein. Because the provider does not receive any personal information of the user, the provider is not responsible for safeguarding such information. An exception to this involves customer loyalty programs, where a user voluntarily enrolls in a separate relationship with the provider. The bank may provide for this by recording the user's program identification to all receipts issued between the program-registered provider and the program-register user, according to the bank's records. (A receipt can be issued to the user and the provider following all transactions.) That the user's (and the provider's) information is not exchanged during the transaction, and is only verified by the bank, also provides a higher level of security.

In non-payment transactions, a user independently submits a request to an intermediate entity (e.g., the bank) to verify an issue or combination of issues related to a transaction (identity verification; asset access; network, site or file access; account/registration current verification; age verification; etc.) after being provided a unique transaction identifier number from the provider. As with a purchase transaction, in a transaction request both parties are registered and both parties are verified. Also, as with the purchase transaction the user does not submit (and the provider does not receive) any personal information of the user.

In a typical non-payment transaction, the user may seek access to a website, access to records (e.g., medical records), access to databases, etc., where the user is registered, that supports use of the OTUC. When prompted, the user selects a non-payment use of the app (e.g., by selecting an authorization menu choice on the app, or entering $0.00 in the amount field, etc.) and chooses the website identifier from a list of registered sites and enters their PIN. The site ("provider") transmits their OTUC, together with the user's, to the intermediate entity, requesting confirmation for the level of authorization for which the user is authorized, according to the sites protocols, which may be as simple as age or access verification, or as complex as a coded level clearance. The level of access authentications (permissions) allows a user's access within a site to be limited, restricted, and changed or cancelled. Access permission levels may also be administered by a local administrator, an increasingly important issue for "cloud" environments. As with payment transactions, the intermediate entity may maintain and provide a transaction summary statement to each party, or the provider's governing entity.

Symmetric-key algorithms are used by methods and systems herein to provide the same cryptographic keys for both encryption and decryption for each half of any given transaction. Given the unique structure and components of the one-time-use code, the symmetric-key provides an advantage to automating the one-time-use code process. The one-time-use code may not be used beyond the acquiring bank, in purchase transactions, because each payment network maintains its own requirements for that portion of such transactions. This advantage occurs because the sequencer, which automatically changes with each use, is used to generate a one-time-use cryptographic key for both encryption and decryption for one half of any given transaction. While convenient, the requirement that both parties—in this case, the user or the provider and the intermediate entity—each have access to the "secret key" is an issue with symmetric key encryption. The systems and methods herein overcome this hurdle by use of a single-use sequencer, imbedded into a one-time-use code, generated by the "app" downloaded from the intermediate entity following the initial program registration process. For any range of reasons, the app may be changed or replaced from time-to-time by logging onto the intermediate entity's appropriate site and downloading a new or updated version of the app.

Because such verifying transactions are finalized behind the intermediate entity's firewall, the intermediate entity is responsible for providing the program apps, APIs, and the transactional "cloud" for processing these transactions. The intermediate entity (and not the provider or user) is also responsible for maintaining the records of each transaction and executing the transactional instructions of the providers and the users. In the transactions, the intermediate entity's role is merely to execute instructions of the user(s) and provider(s) that are used to finalizing each transaction.

By agreement, the ability to finalize any transaction cannot exceed the information the intermediate entity has on hand. For example, the intermediate entity's ability to finalize a purchase transaction involving a payment card issued by another bank has the acquiring bank process the payment to the issuing bank for verification that the funds are available. However, because the acquiring bank is able to verify its customers' presence, their program registered payment cards and its customers' verified electronic signatures, program related requests for authorization (to the issuing bank) would be processed as person present, card verified, signature present and verified transactions, rather than as a card-not-present transaction—pending funds authorization from the issuing bank. This effectively means that the funds need only be available, at the issuing bank, in order for the transaction to be funded. It also means considerable savings in the costs of the transaction. Non-payment transactions are concluded without the assistance of an issuing bank.

Thus, the one-time-use code allows the use of personal devices, including mobile devices, to safely and securely conduct transactions in cyberspace. Further, the methods and systems herein do this by allowing each party's information to be stored and maintained in a single place—behind the bank's firewall. Also, the methods and systems herein provide for transactions to be verified in a single place—within the bank's transaction secure environment/cloud, with the limited access to and use of that environment restricted to verification of an encrypted, OTUC, the elements of which can only be verified by the bank.

The methods and systems herein provide a unique program and approach for securing cyber-transactions (online; in-person; P2P; WiFi, mobile; etc.) that applies to both payment and non-payment transactions. The methods and systems herein allow the bank to identify each party to each transaction, create an electronic-signature for each party, providing for each such party to be bound, at their request, to their role under each transaction and to their instruction to the bank to finalize each transaction. Further, the verified elements allow each cyber-transaction to be finalized in real-time.

The methods and systems herein operate over existing rails (i.e., payment network systems), reduce and simplify transactional steps. Further, the methods and systems herein provide a program driver for banks, merchants, other institutions and businesses, and consumers; replace the username and password scheme with a single one-time-use code that acts as a multi-factor authenticator; and eliminates fraud and associated risks, storage costs, exposures, compliance costs, etc. Additionally, the methods and systems herein create an automatic audit trail, support loyalty program options that are automatically updated with each transaction receipt, without exposing personal or financial information to a provider.

The methods and systems herein also encrypt the transaction details and verifiers, such as choice of payment card, name, address, etc., providing loyalty program tracking and credit updates. Further, the e-signature, the identity verification, the person-present verification, age verification, residence verification, active enrollment verification, and qualification verifications abilities of the program provide support for such online activities as: online voting; online gaming/gambling; remote signing of agreements and other documents in cyberspace; etc.

The OTUC creates a safe and secure transactional platform in cyber-space (a "transactional secure environment," or "TSE") providing the basis for a secure "bank interchange platform" or "provider transactional platform" for supporting transactions in cyberspace. The requirement for merchants to store and secure payment card transaction records is eliminated, and loyalty programs are transformed into automated, receipt-based systems. The methods and systems herein are useful for digital copy restrictor situations (i.e., "file" identifier and "user access permission/authorization") where mere access can generate a file copied identifier permission, while "unauthorized parties" can trigger alarms by simply accessing files or unauthorized areas.

A history of litigations over the control and costs of card network transactions has highlighted even the government's frustration with ever-increasing transaction costs, including cyber-transaction costs, and the lack of alternatives. In part, because the program operates over existing rails, the self-regulated payment networks are assured their reasonable program costs, and banks maintain their regulated anchor-role in the transactions to the benefit of all parties. This makes use of existing relationships, providing for banks and regulators to fulfill their established roles. As such, the "intermediate entity" is the ideal party to act as the centerpiece for verifying and securing all cyber-transactions. The methods and systems herein provide the tool—the symmetric-key encryption program for securing, transmitting and verifying the one-time-use code—for simplifying (i.e., automating) and conveniently securing and verifying each transaction, without the cost and need of establishing another network, regulatory system, or process.

As noted above, the lack of cyber security has become seemingly accepted as a form of "toll" that all organizations and individuals must pay for accessing the information highway. The methods and systems herein bring together the tools to secure and finalize all transactions in cyberspace, eliminating such "tolls." More specifically, the methods and systems herein provide solutions that position the program bank to verify each registered program member's actual presence (or, actual agreement to be deemed present) during a transaction; to verify each party's understanding and agreement to each transaction; to verify each party's legal signature agreeing to the terms of the transaction; to verify each party's agreement to either pay for a product or service, deliver a product or service, or otherwise be held accountable for their performance under the terms of each agreement; and, to maintain a central record storage point for each transaction.

In order to carry out and safeguard the instructions and agreement of the parties to a transaction, the bank uses the OTUCs to verify each party's presence (verifying the code's elements to the banks secure records) and, under instruction from each party to bind and to finalize each transaction, affixing each party's OTUC, as their unique, eSignature (see, ESIGN Act of 2000) to the time-stamped record of each transaction. A transaction receipt, verifying each transaction is sent to each party acknowledging the bank's execution of the transaction, at each party's instruction, and notifying each that the bank has stored and will maintain a master copy of the transaction, per each party's instructions and under each party's agreement with the bank, established when each party opened its program account with the bank.

As noted above, each use of the OTUC serves to eliminate fraud and the need for unproductive mitigation procedures and extraneous costs by verifying the elements, allowing each cyber-transaction to be finalized. Also as stated, the methods and systems herein allow the bank to verify that the parties are actually present during each transaction and allow each party to instruct the bank to finalize each transaction, sealing those instructions with each instructing party's verifiable electronic signature (the OTUC). The records are stored and maintained by the bank, with a receipt sent to each of the parties.

Because the bank is merely following the instructions of its customers (authorization for which each party executed when they enrolled in the program), the bank is taking no responsibility in the transaction other than to verify each of its customer's authorization and agreement. The bank's agency is limited to verifying the parties' presence, their payment card(s), and their verified electronic signature (using the KYC records it verified and maintains as a requirement of law and the one-time-use code) and following their (the clients') instructions to finalize the transaction and hold each party responsible for their agreed role. The bank also keeps a verified record of each transaction, again, as an agreed service to each customer.

In order to accomplish its instructions, the bank provides the app to each customer (user and provider), which creates the OTUC for each transaction as described above, with each party conveying that OTUC to the bank's platform ("cloud") in order for the bank to fulfill its clients' instructions. Each party's OTUC is used for the transaction details, each party's identifiers are used for comparison to the records in the bank's files, each party's instruction is used to verify and finalize the transaction, and the transactional receipt is used to confirm each such transaction.

As noted above, for a payment transaction, the bank acts as an acquiring bank, reformatting the request for authorization according to the requirements of the particular card network (Visa®, MasterCard®, American Express®, etc.) and forwarding the request, as a person and payment card verified, signature present transaction (rather than a "CNP," transaction). The OTUC is based upon identifier values, those values combine to allow only the bank to validate the identity and presence of the parties, the OTUC is a multi-factor authenticator, which cannot be replicated without permission or access to and control over the bank's servers, and the bank is a regulated entity. These factors, together with the ability to confirm the ever-changing sequencer values create an efficient secure environment for cyber-transactions.

As noted above, cyber security is compromised by the exchange and storage of information; and, securing this information, once it has been exposed, is, at best, a Herculean task. The methods and systems herein eliminate this exchange of information and create a barrier to the use of information that has been exposed, using the bank's OTUC. The elements of the methods and systems for the herein OTUC are values that the bank takes from each party's personal information (personal value identifiers), at the time of registration. These elements are combined with values the bank takes from each party's registered device (device identifier). These values are combined with a progressive sequencer as the elements of the OTUC, all of which are encrypted prior to being transmitted to the bank from an app on the user's or provider's device, along with a payment source instruction (related each party's eWallet at the bank) for purchase transactions. It is the bank's internal protocols, as well as those of the code itself, that prevent the replication, for use, of any user's or provider's OTUC.

The methods and systems herein run as any payment card industry transaction would beyond the point of the acquiring bank reformatting the request for authorization and submitting the transaction to the appropriate card network. Again, the parties participating in a transaction are registered and approved by the bank, and the app is installed and configured on the respective devices. Further, there can only be a single bank or bank consortium, operating as the acquiring bank. Also, both parties participating in a transaction are connected to the Internet and have access to the bank's site. Further, the acquiring bank has a 'bank cloud' that operates the methods and systems herein. All payment card industry elements are in place for the acquiring bank, such as interchange, rails, etc.

With respect to some common terminology, the bank cloud is the system that the bank designs and implements to talk to their infrastructure, and the bank cloud contains the API entry points accessed by the apps on devices. The app is the software machine that generates the one-time-use identifiers that interact with other apps and the bank cloud, and such software is similar whether it is on a merchant's device or consumer's device. Transaction identification identifies a transaction and allows the two halves of a transaction to find each other in the bank cloud. An account identification refers to either the user or provider file identifier, and is what the acquiring bank uses to look up each party's account to access the current sequencer value and other data used to decrypt the one-time-use code data and processing the transaction via payment card industry rails, with respect to a purchase transaction, and returning verification decision with respect to a non-purchase transaction. The encrypted data is the data encrypted by the app and contains several key value pairs of data (and the encrypted data is the OTUC). The methods herein obfuscate the sequencer, so the encryption keys are random looking strings.

Referring now to the drawings, FIG. 1 illustrates the flow of data between entities when initiating a payment transaction. When a consumer ("user") 108 is ready to pay for services, the merchant ("provider") 100 uses their app to create a payment transaction total. Upon being notified by the user 108 that payment will occur using the methods and systems herein, the provider 100 activates their app (if not already active), chooses 'receive payment' from the options, enters the amount of the transaction, including tax, discounts, etc. Optional provider requests might include or be limited to age verification, delivery address, etc. The provider 100 then clicks 'generate bill', which shows the bill. The provider 100 now waits for payment. On the provider app screen, there is a "not paid" indicator, and when the user 108 pays their bill, this indicator will change to "paid."

Figure 2:
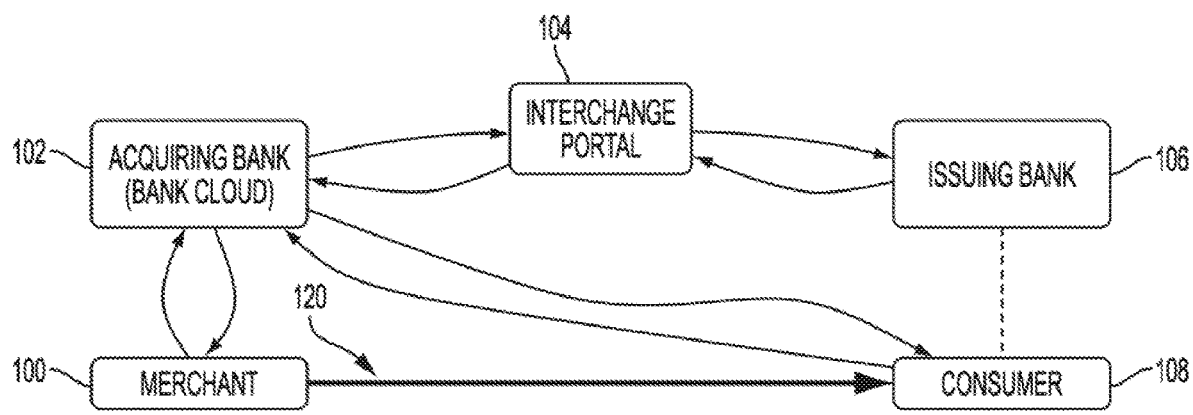
FIG. 2 is a schematic diagram illustrating systems used herein.
Figure 3:
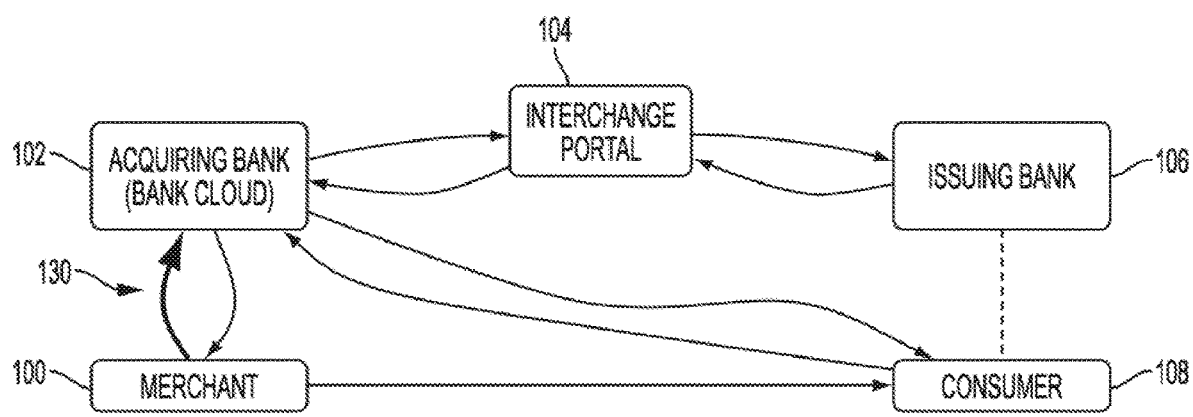
FIG. 3 is a schematic diagram illustrating systems used herein.
Figure 4:
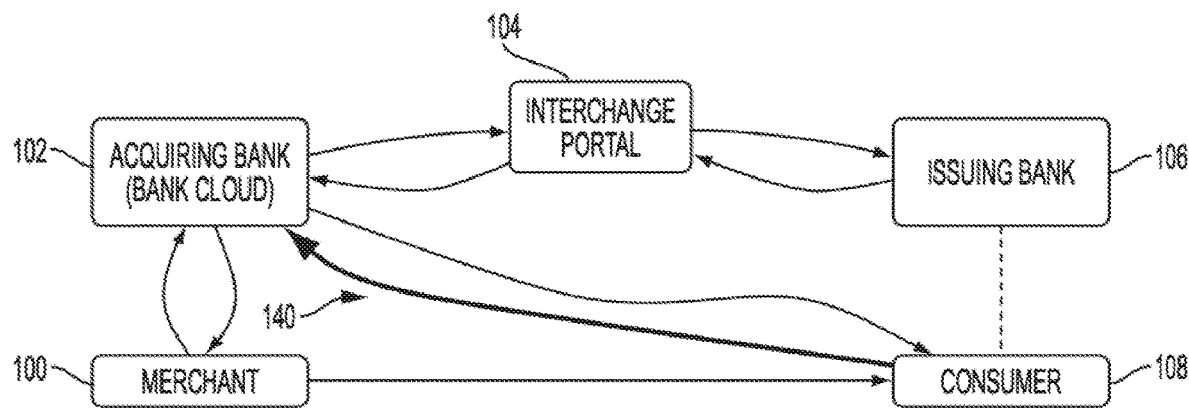
FIG. 4 is a schematic diagram illustrating systems used herein.

When the provider 100 generates the bill, the provider generates transaction identifier, assembles the transaction data to be encrypted and encrypts such data (e.g., a JavaScript Object Notation (JSON) object), and may create, for example, a quick-reference (QR) machine readable code with bill particulars which may be used by the user and user app for mobile or in-person transactions. As shown in FIG. 2, by the darker line 120, the provider 100 may display or transfer the computer or human readable code to the user 108. As shown by the darker line 130 in FIG. 3, the provider app 100 may, then, assemble and send its part of the transaction to the bank cloud where it will sit until the transaction is completed or cancelled. The information used by the user's program app to convey the user's information to the bank, is the transaction identifier, the user account identifier with the bank, the identifier for payment card to used, and the transaction amount. As such, these values may be entered manually into the user app or may be automatically or otherwise entered if the user's device has direct communication with the provider's system.

In one variation of payment choice, there may be a visible computer readable code on the provider's device 100 for the user 108 to read. The user 108 activates their app (if not already active), chooses, 'make payment' from options, which brings up a camera box in the app and captures the code and brings up the next screen on the user app.

When choosing payment method, there are external accounts (Visa® or MasterCard®, checking account, etc.) that the user 108 can tie to their account. The user selects the payment type, and the app records the choice. The user 108 reviews the bill on their device, containing the purchase amount and other requests. For example, if a delivery address is requested, a pop-up will open and the user 108 can select a delivery address. The payment section on the consumer app will display a variation of "type in your PIN to execute this transaction." When the user 108 types in their PIN, the next screen will indicate "processing payment . . . " until the transaction is finalized. In terms of a non-payment transaction, this screen will indicate "processing transaction . . . ."

In terms of a computer readable code or similar conventional program support function, when the user app, recognizes the code or function, it decodes it into its elements; and then stores the transaction identification and information. The user app displays the payment amount, merchant name, etc., and waits for the PIN to be entered. When the user 108 types in their PIN, the consumer app sends its part of the transaction to the bank cloud and waits for transaction result.

Figure 5:
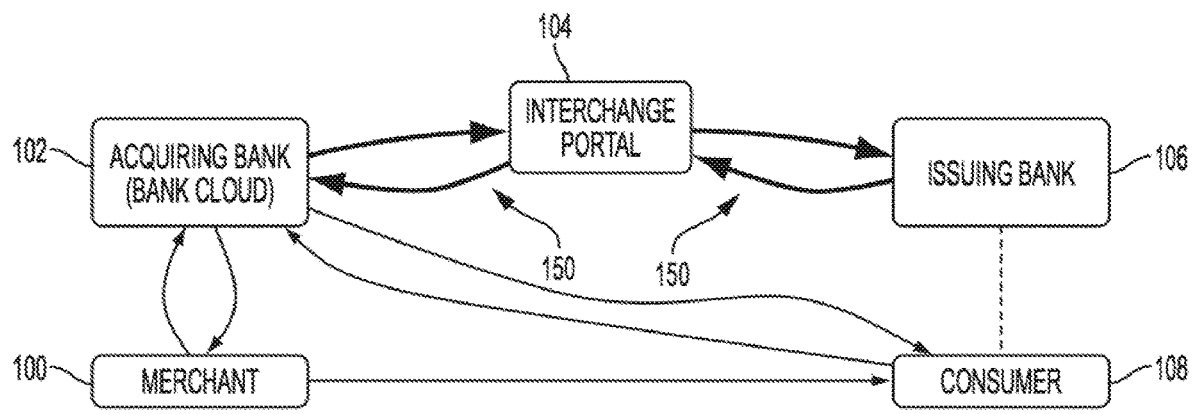
FIG. 5 is a schematic diagram illustrating systems used herein.
Figure 6:
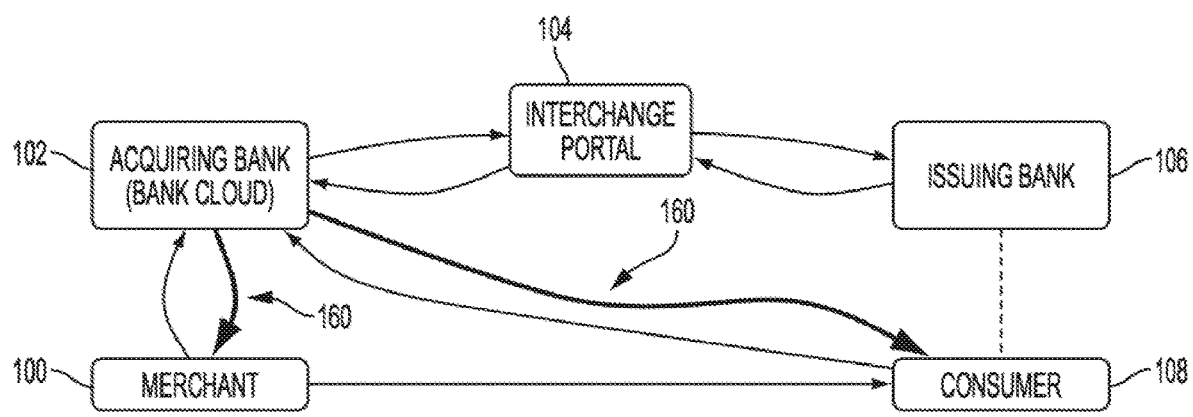
FIG. 6 is a schematic diagram illustrating systems used herein.

Then, as shown in FIG. 5, at this point, the bank 102 has both sides, i.e., provider and user, of the transaction. The bank 102 matches both sides of the transaction, using the transaction identifier, decrypts both sides of the transaction, by accessing the duplicate app of each party's program app to verify retrieve each party's decryption-key, verifies both parties, creates a payment card industry "request for authorization," and makes a request to interchange portal 104. The interchange portal 104 in turn forwards the request to the issuing bank 106. This is shown by the darkened lines 150 in FIG. 5. The remainder of this payment transaction is identical to any other payment card industry transaction. Based upon the result (funds available or not), the issuing bank sends an authorization or decline or error message, and the parties are notified (item 160 in FIG. 6).

While the general framework is set forth above, in some specific examples, a merchant JSON object is passed to the consumer app (item 120, FIG. 2) by way of, for example, computer readable code. That object 120 contains fields that the consumer's device app uses to complete the transaction, and such fields can include among other, for example:

```
account_identification - account identification to PAY
    1. account_id - account_id to PAY
    2. account_name <name> - name of merchant is included in the 'Enter PIN
to pay
    3. amount_id - If there is an amount associated with transaction
    4. options - verify_age | shipping_address
```

The JSON object that will hold this data can be, for example:

```
{
    "transaction_id": 987654321,
    "account_id": 123456,
    "account_name":
    "Al's Towing Service",
    "amount": "$213.82"
}
```

Merchant JSON Object Passed to bank Cloud (e.g., the object that gets encrypted into a OTUC) can be, for example:

```
{
    "account_id": 123456,
    "amount": "$213.82"
}
```

The user's information is stored on the bank's servers, generally spread across multiple servers, behind the bank's firewalls, and this user information is securely accessible by the bank cloud. Each account includes both primary account information and device information, such as that shown in FIGS. 7 and 8. More specifically, in FIG. 7 the primary account information stored on servers behind the bank's firewalls can include the account identification (user account number), name, billing address, etc. As shown in FIG. 8, the device information stored on servers behind the bank's firewalls for different devices (one user account can be linked to multiple devices) can similarly include the account identification (user account number), device identification (using manufacturer, model, serial number, internal component identifiers (processor serial number, hard drive serial number, mother board serial number, etc.)), sequencer identifier (again, each sequencer is unique), other identifiers strings (generically identified as salt, pepper, etc. in FIG. 8), etc.

As noted above, a sequencer is assigned to every device registered to an account. The sequencer increments with every transaction, and is used as both a value variable for the OTUC and as the encryption/decryption key. Because corresponding identical sequencers identically increment on the device and in the bank cloud, both parties can generate the same encryption key for a given transaction, but for every transaction, the identical encryption keys produced, in part, using a uniquely sequenced number generated by the matching sequencers is different.

To provide a higher level of encryption, the number produced by the matching sequencers is applied to a hashing function. More specifically, a hash function produces the encryption key (created by the app to encrypt the data) and the encryption key is also produced, in part, using a uniquely sequenced number generated by the bank cloud to decrypt the same data. For example, the encryption key can be created by hashing the strings: string #1+sequencer+string #2 (in any order). Again, the same as salt and pepper in FIG. 8, string #1 and string #2 here just refer to random string characters that are combined with the sequencer number (in any order). These random string characters (string #1 and string #2) are assigned when the device is registered, are unique to each device, and do not change; however, by combining such random string characters with an incrementing number produced, in part, using a uniquely sequenced number generated by the sequencers, each time the combination of non-changing random character strings and sequencer number are hashed, a unique one-time-use encryption is identically produced by the matching sequencers (the sequencer operating on the user's device and the matching sequencer at the bank (or other intermediary). The random character strings and hashing function are used so that the encryption key cannot be determined using a brute-force attack with incrementing numeric keys.

Again, the encryption described herein is used to safeguard the data going from the app to the bank cloud, and the encryption uses a sequencer to create an ever changing key pair on the device and server. The OTUC is the body of what both sides of the transaction sends to the bank cloud. It includes the transaction identification, the account identification in unencrypted form, and the encrypted string. In one specific example, the app can create the OTUC as follows: <transaction_id>:: <account_id>:: <encrypted_data>.

Presented below is one example of the bank processing an OTUC.

Step 1, split the elements:

```
turn <transaction_id>::<account_id>::<encrypted_data> into:
    transaction_id = <transaction_id>
    account_id = <account_id>
    encrypted_data = <encrypted_data>
```

Step 2, take the account_id and look up the Account.

Step 3, create the encryption key by hashing together the string #1+sequencer+string #2 then increment the sequencer.

Step 4, decrypt the encrypted string using the key. The methods now have the key→value pairs of information that was encrypted.

Step 5, verify that device_id belongs to account_id, and that the amount of both sides (merchant side and consumer side) matches.

Step 6, retrieve the method of payment the consumer specified (from their account), and delivery address (if applicable).

At this point, all the validation has been performed, and all data used to ride on the payment card industry rails has been gathered, and the acquiring bank makes an API call to get a new transaction identification. This is called by the initiator of a transaction, and checks to make sure the device has an active connection to the bank cloud, retrieves a new transaction identification from the bank cloud, retrieves routing information (if necessary). Such routing information is included in the computer readable code for the consumer, and tells the app exactly to which bank cloud subdomain to connect.

Transactions are logged using a stacked hash algorithm that ensures that every transaction for every device is recorded in the order that they occurred. For example, a log that is associated with every device can include a first column that contains the hash of the previous lines 2 hashes (if this is the first entry into the log, it is seeded). The second column can contain a hash of the third column, which is the transaction data. This logging continues for however long the device is making transactions, and such a log can be used for any proof purpose (e.g., to be presented in a court of law to prove transaction validity, etc.). Also, the methods and systems herein can use web sockets to allow information to be pushed back to the app on any device.

While the foregoing generally explains the operations of the methods and systems herein, a more complete understanding can be found through the following examples. In one example, a user may wish to purchase items from a merchant through browser on a cell phone. When the user is ready to pay for the items in the shopping cart, they can choose the payment method from the payment options. When this happens, the merchant servers combine various elements into an application readable format. The required elements may consist of transaction_id, merchant_id, amount, etc.—and be combined into a JSON object, or similar data containing structure. It is worthwhile to note that represents the key→value pairs of data. It is also worthwhile to note that this is the data contained in any computer readable codes that are created.

At this point, the merchant sends their half of the transaction to the bank cloud, where the transaction will wait for the consumer transaction to make its way to the bank cloud. By "send" what is meant is that a call is made to the bank's API with the key→value pairs, as would occur with any traditional transaction. The merchant waits for a response back from the bank, which happens once one of the following condition are met: the transaction times out (e.g., there was a network error, or the consumer did not type in their PIN in the allowed timeframe); the transaction is approved, and the merchant gets an authorization code; or the transaction is declined, and the merchant is notified of a transaction error.

The merchant, immediately after posting their half of the transaction to the bank cloud, also provides the JSON object to the consumer. The consumer highlights and copies this data to the device's clipboard. This can be achieved in a number of ways. For example, the user can highlight the data and click "copy"; or the merchant can provide a button, which will copy the data to the clipboard.

Next, the consumer opens the app on their phone and pastes the JSON into the JSON box. The app evaluates the data, creates the OTUC and prompts the user to type in their PIN if they want to pay the merchant the amount shown. The consumer half of the transaction is also a JSON package (or something similar) including key→value pairs of data. This package includes the transaction identification, file identification, and the OTUC and can be presented, for example as:

```
{
    'transaction_id':'5Bdir-384dD-384Gdls',
    'file identificationid':'d8dFyf8-&^587d-hdufkh',
    'OTUC':'<some encrypted base64 string>
}
```

When the consumer types in their PIN, the above package is sent to the bank cloud, where it is matched to the merchant half by comparing the transaction identification. Once matched, the bank will verify both the merchant and consumer (through the file identification), decrypt the OTUC, compare the amount in the OTUC with that presented by the merchant, check the consumer's balance, and authorize the transaction if all the conditions are met. Both the consumer and merchant are then notified. When the merchant receives an authorization code, they can rest easy knowing that they made a sale with no fear the sale will turn into a chargeback. The entire transaction should take several milliseconds less than traditional transactions.

In this example, regarding what the merchant does to support this transaction, the merchant sets up their checkout page to hook into the API (bank cloud). Regarding a computer readable code, there can be one visible on the merchant page, but with browsers on mobile devices, there is no easy way to snapshot it, so a copy of the JSON is used instead. In this example, both merchant and consumer use a connection to the Internet. Regarding whether it is possible to go through SMS messaging and not through the Internet, methods and systems herein can set up the device software to send a text to the bank's cloud. The authorization is sent to the merchant as normal, and the bank sends an SMS response to the consumer, instead of through the Internet. Also, the merchant app can also use SMS to upload their half of the transaction, and this is useful in developing countries, where cellular service is widely available, while the Internet is not. The methods and systems herein work well when both halves of the transaction are able to independently reach the bank for matching and processing.

Another example makes a purchase through a merchant's app on a cell phone. Here, when the user is ready to pay for items in their shopping cart, they choose the payment option. The merchant sends up their half of the transaction, then the merchant app looks for the app, opens it (if not already opened), and passes the JSON object to the app. From this point, everything works as in the previous example, the user types in their PIN, and the consumer half of the transaction is sent to the cloud to be matched and processed. Confirmations are sent to both consumer and merchant and the transaction is complete. Again, here, the merchant builds the API (bank cloud) into their app, and no computer readable code is involved, as the app itself passes the pertinent data to the app.

In another example, a purchase is made on a personal computer, with the app operating on the personal computer. At checkout, the payment option is chosen, the merchant compiles data, and sends their half to the bank's cloud. From here, the merchant may choose to provide both the JSON object and a computer readable code. The consumer opens up their app, and does one of two things: 1) they can choose to capture the computer readable code by drawing a box around it (app feature); or 2) they can simply copy and paste the JSON into the app. Once the app receives the JSON (or computer readable code—it will turn the computer readable code back into JSON), the user app will, as in the above cases, prompt the user to enter their PIN to purchase. Everything else is as in the previous examples. Here, the merchant builds the API (bank cloud) into their checkout page.

In a further example, a purchase is made on a personal computer, with an app operating on a phone or tablet. At checkout on the personal computer, the user chooses the payment option. The merchant submits their half and provides the JSON and computer readable code on the checkout page. At this point, the consumer operates their phone, opens the app, and centers the camera box over the computer readable code appearing on the screen of their personal computer. The app (on the phone) converts the computer readable code back to JSON, creates the consumer half of the transaction, and submits to bank cloud for processing.

In a different example, a user can make an in-store purchase, with the app operating on a phone or tablet. At checkout, a computer readable code appears on the merchant's point-of-sale system. The merchant's transaction half is sent up to cloud and the merchant waits. The user opens up their app and, again, centers the camera box over the computer readable code. The app will, again, convert it to JSON, show the consumer the purchase amount, create the OTUC, and require PIN. Both halves meet in the cloud, and both parties are notified of success. Here, the merchant has a point-of-sale system with capabilities, and both the merchant and the consumer use a connection to the Internet.

In an additional example, the methods and systems herein are used to verify identity (without any purchasing element). All of the above examples can be used here (simply with the purchase price element removed) to turn the transaction into an identity verification system. Each half of the transaction would meet up in the bank's cloud and be authorized or declined based on the same set of rules. Additional requests might include age verification, which would be included in the returned authorization to the entity requiring authorization.

A further example is a person-to-person money exchange. In this example, two users want to exchange money between each other, and they do so simply by both opening up their app. Either sender or receiver can initiate the transaction. If a sender, their JSON elements are created and compiled, and the receiver takes a snapshot of the computer readable code to receive the funds. If the receiver is requesting money, they can enter the request amount, their app compiles the JSON data and turns it into the QR Code. The payer/sender centers the camera box over the receiver's computer readable code. The payer is prompted to pay the amount by typing in their PIN. Both sides meet up in the cloud for processing. This example is very useful for street vendors, food truck owners, etc.

Regarding the details of establishing an account, a "user" establishes a one-time-use code ("OTUC") account by providing the bank ("bank") with the know-your-customer (KYC) information. The related processes are used to conform to a customer identification program (CIP) ("KYC") information requirements. After verifying this information, the bank establishes a "wallet account" ("wallet") for the user and instructs the user that any payment/payment card program the user intends to use under the OTUC is added to the wallet, then, verified and assigned an account reference code.

The user can link each of user device to the wallet, for access to any specific payment account; however, this requires foot-printing each device in order to identify each device separately, as part of the OTUC. Once a device has been foot-printed and added to the user's account, the user app for the OTUC may be downloaded to the specific device, and the user may initiate any OTUC transaction from that device by activating the application on the specific device and entering the user's PIN. Only registered devices, with an OTUC specific to that device, may be used under the OTUC.

To use the OTUC in order to secure a transaction, the transaction provider ("provider"—e.g., a merchant, in a purchase transaction, or a website operator in a non-payment transaction) is also registered and approved with the acquiring bank, as a provider. More specifically, a provider establishes a OTUC account by providing the bank with its KYC information. After verifying this information, the bank establishes a provider account (merchant account) for the specific provider. The provider, then, downloads the program API from the bank, allowing the provider to add the OTUC to its transactional platform. The provider program encrypts the provider's transactional information, forming a OTUC specific to the transaction and allowing it to be paired, by the bank, with the user's OTUC.

The acquiring bank can be a central element of all OTUC transactions, and all OTUC participants are required, therefore, to establish and maintain a OTUC account with the bank. The bank is often a large issuer and acquirer of payment transactions, familiar with reformatting "requests for authorization" and this is useful because payment card programs processed under the OTUC program are processed through the payment card networks; however, they are not processed as card not present transactions, they are processed as verified (i.e., card, signature, and cardholder verified transactions). The bank also maintains all records of all OTUC transactions, minimizing the exposure of such records. Also, some banks can provide "loyalty program" information to merchants under the program by including loyalty program member account numbers with every transaction receipt, which are provided to each party to a transaction confirming each transaction.

The OTUC is a single-use code that is formed using elements of the following. For the user: 1) user identifier values, as established and verified by the bank under the KYC procedures; 2) the user's account number with the acquiring bank; 3) the provider's transaction/session number; 4) a transaction sequencer; 5) and, the total dollar value of the transaction (this value is added to the encrypted transaction file, allowing the bank an additional verification value once the file is decrypted; e.g., "0" value for a non-purchase transaction). For the provider: 1) provider identifier values, as established and verified by the bank under the KYC procedures; 2) The provider's account number with the bank; 3) the provider's transaction or session number; 4) and, the total dollar value of the transaction. The app downloaded and installed by each user generates a new OTUC for each transaction that must be confirmed by the bank for each transaction before the transaction can be further processed and finalized.

Figure 9:
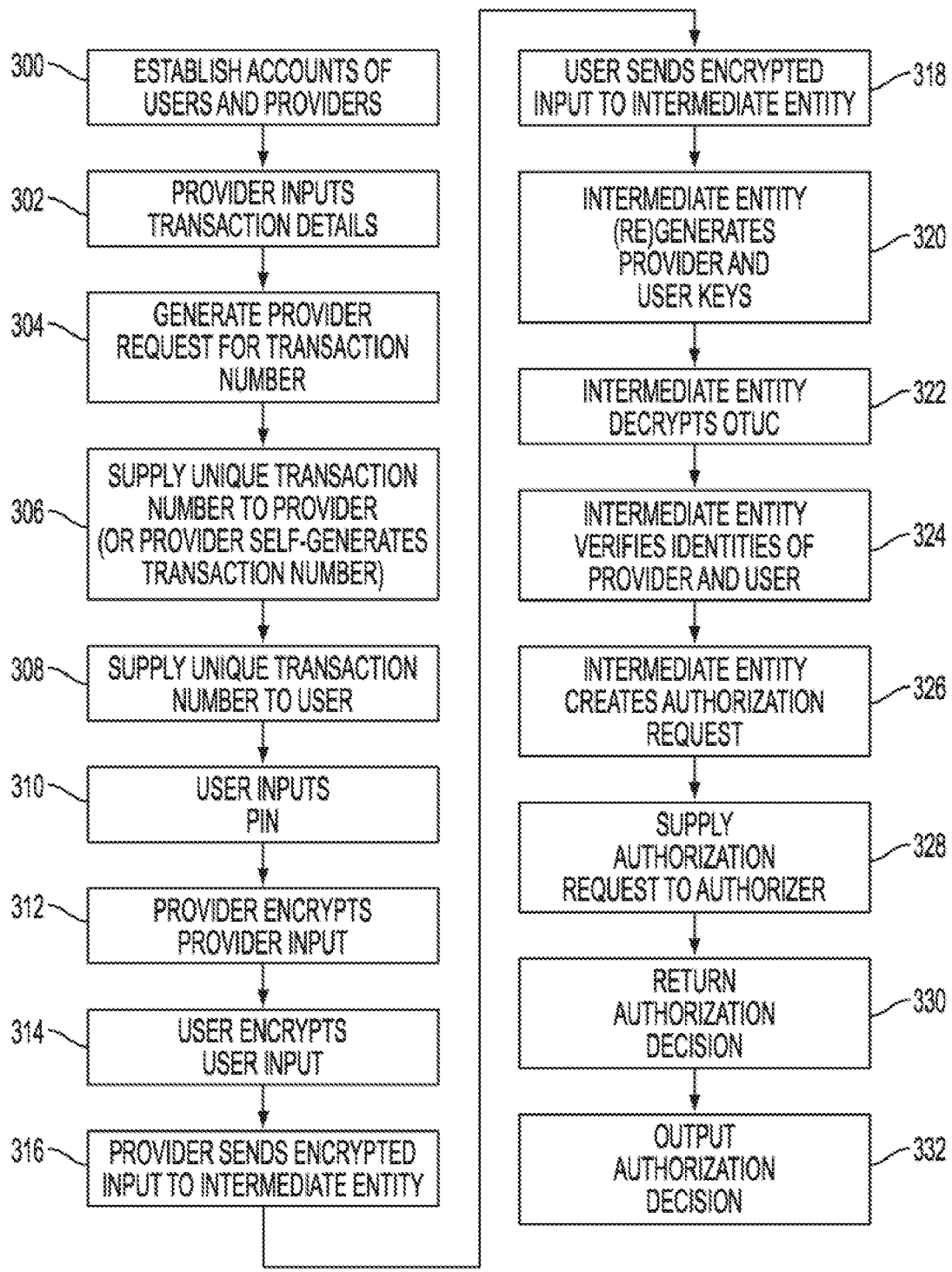
FIG. 9 is a flow diagram of various methods herein.

FIG. 9 is flowchart and FIGS. 10-15 are device and screenshot drawings illustrating exemplary methods herein. In item 300, these methods establish accounts of registered users through registered user devices and establish accounts of registered providers through registered provider devices, using an intermediate entity (e.g., a financial institution; a financial clearing house; a resource controller; a verification entity, etc.). Again, a provider can be, for example, a merchant, a resource storage entity (e.g., medical records, etc.), an access control agent, a communications entity, etc., and a user can be, for example, a customer, a consumer, an organization, an individual, etc.

In item 300, a secure session is established between the intermediate entity and the user/provider and personal information of the user/provider is provided to the intermediate entity during such session. Such personal information can include names, addresses, birthdates, bank account numbers, tax ID numbers, social security numbers, family names and relationships, passwords, etc. After this information is provided securely to the intermediate entity, the app optionally deletes such information from all locations within the user/provider devices.

During the registration process in item 300, the intermediate entity provides a computer program application to each registered user and provider, and such applications allow the intermediate entity to control certain operations of the user devices and provider devices and cause the user and provider devices to take certain actions. Each application so provided maintains a unique sequencer that generates codes that are used as parts of encryption keys (or encryption codes). Each user/provider is also provided one or more unique alphanumeric encryption strings during registration. The number sequenced by the sequencers is used in combination with such unique alphanumeric encryption strings (that do not change and are not sequenced) and the combination of both is applied to a hash function to generate the encryption keys. During registration, each provider and user electronically sign an agreement to be bound by their actions taken, and consents provided through their respective apps. Further, each contract is identifiable by a unique contract identifier that is different for each user and provider, and this contract identifier is one of the items that can be included within each transaction. Therefore, this relationship begins with registration, which binds the bank and the user (and the bank and the provider) to a contractual relationship.

Also, the intermediate entity maintains duplicate apps containing duplicate sequencers for each app/sequencer that it provides to a user or provider, and the duplicate sequencers produce the exact same codes as the provider/user sequencer to which the duplicate sensor corresponds for a given transaction, because the duplicate sequencers are always synchronized with each individual sequencer in each individual application. More specifically, each user/provider app's sequencer and a corresponding duplicate app/sequencer maintained by the intermediate entity are programmed to generate the exact same sequence of different codes. Also, each time an application sequencer generates part of an encryption key, the application communicates with the duplicate sequencer maintained by the intermediate entity to keep the two sequencers synchronized. Thus, each time a new sequenced number is requested from each sequencer (the application sequencer and the corresponding duplicate sequencer maintained by the intermediate entity) both sequencers generate the same new (different) sequenced number. The user/provider sequencers thus generate sequenced numbers that are used to generate one-timeuse encryption keys for the registered user devices and the registered provider devices that are unique to each other, and unique to each transaction.

In item 302, the provider inputs various details about the transaction (e.g., quantity, price, amount, access being requested, authorization being requested, etc.) into the application running on the provider device. In item 304, a registered provider device can use its provider application to request a new transaction number for a new transaction between that provider and one of the registered users. Alternatively, in item 306, the provider app can self-generate a unique transaction number that the intermediate entity would expect (by way of the duplicate app to the provider app maintained by the intermediate entity).

The transaction number is what the bank uses to pair the user's OTUC with the provider's OTUC in order to confirm each portion of the transaction. For that reason, the transaction number is not encrypted. Because the encryption key for each of the provider and user OTUCs is maintained within each party's account records, each party's account identifier is also not encrypted. The purpose for generating unique transaction numbers, and sending an unencrypted unique transaction number with the encrypted portion of the one-time-use code is to allow the user and the provider part of the transaction to be paired by the intermediary entity/bank. The user and provider account identifiers are the only other unencrypted portion of the transaction code. In response, in item 306, if not self-generated by the provider app, the intermediate entity supplies a unique transaction number to the provider device that requested the transaction number. Again, the intermediate entity/or provider app generates a different unique transaction number for each different transaction.

Figure 10:
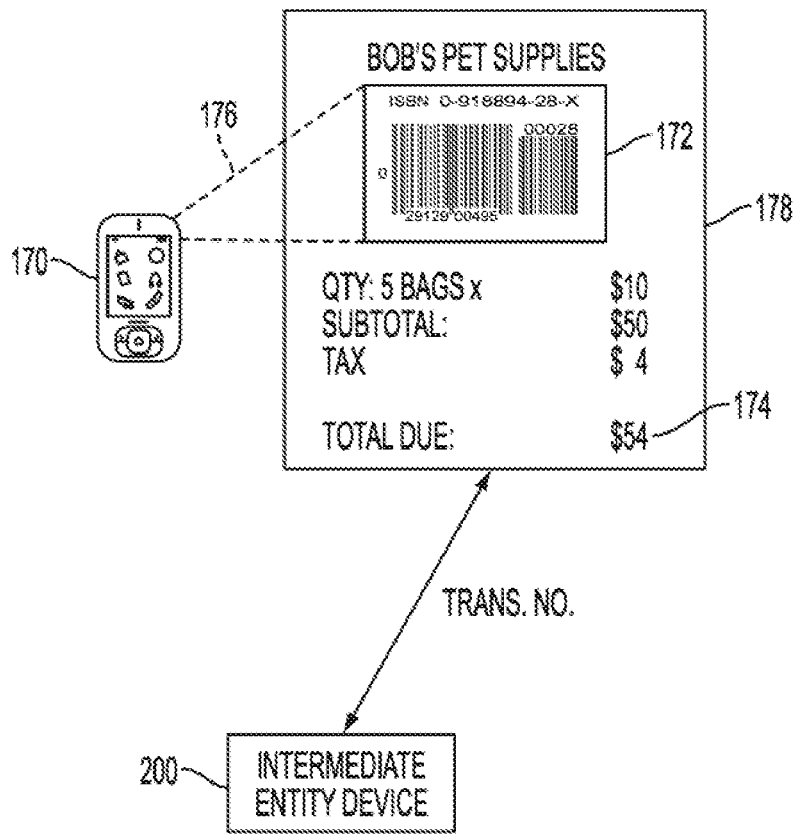
FIG. 10 is a schematic diagram illustrating systems used herein.

This is also shown in FIG. 10 where a provider device 178 (illustrated in FIG. 10 as a screenshot of the provider app shown on the provider device 178) requests a new transaction number ("Trans. No.") from an intermediate entity device 200 and the provider device 178 receives the same in return. For example, in a purchase or an access authorization transaction, a registered user may verbally or electronically inform a registered provider that they wish to use the intermediate entity to complete a transaction with the registered provider, without providing any identifying or personal information to the registered provider. This provides substantial user privacy protection because, with the systems and methods herein, the user does not identify themselves to any registered provider, and the user remains completely anonymous to the provider. Without having any information about the user, the provider merely makes a request to the intermediate entity for the new transaction number in item 304.

Figure 11:
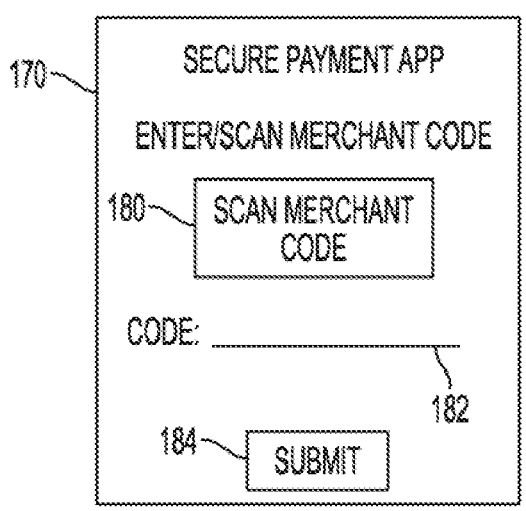
FIG. 11 is a schematic diagram illustrating screenshots provided herein.
Figure 12:
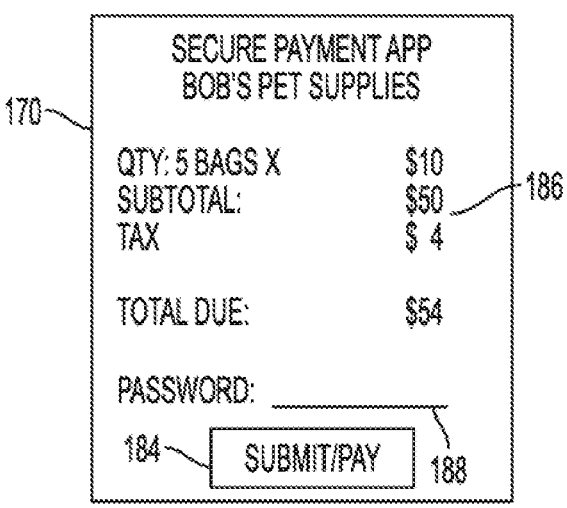
FIG. 12 is a schematic diagram illustrating screenshots provided herein.

The intermediate entity causes/controls the provider device (through the application) to supply the unique transaction number to the user device (internally, wirelessly, optically, by having the provider verbally convey the transaction number to the user, etc.) as shown in item 308. This is also shown in FIG. 10 where a user device 170 optically scans a computer-readable code 172 displayed on the provider device 178 screen (the scanning action as shown as item 176 in FIG. 10). The code 172 includes the transaction details and the unique transaction number. The provider device 178 can also optionally display some human-readable information, such as quantity of items being purchased, and the total amount due (item 174) and can also display the transaction number in human-readable form. Additionally, FIG. 11 illustrates a screen of the user app displayed on the graphic user interface of the user device 170 that displays a menu option (e.g., button) to cause the user device 170 to scan the computer-readable code 172.

Thus, in item 308, the intermediate entity can cause (through the app) the provider device to display the computer-readable code 172 on a visible display of the provider device (a display that is readable by an optical device of the user device), can cause (through the app) the provider device to display a human-readable code 172 on the display of the provider device (positioned to be readable by the user), etc. For example, FIG. 11 illustrates an entry field 182 of the user app where the user can manually enter (e.g., type, speak, etc.) a human-readable code into the user device after reading the human-readable code 172 on the display of the provider device 178 (after which the user can select the submit menu choice 184 to submit the manually entered code). The provider device can alternately wirelessly electronically transmit (e.g., using wireless fidelity (WiFi) technology, near field communication (NFC) technology, etc.) a code to the user device using a wireless device of the provider device that is capable of wirelessly communicating with a wireless device of the user device (and this is also illustrated by item 176 in FIG. 10). In other situations, the intermediate entity can cause (through the app) the provider device to internally electronically communicate the unique transaction number from a first application operating on the user device to a second application operating on the user device (and, again, this is conceptually illustrated by item 176 in FIG. 10). Therefore, item 176 also illustrates a user cutting and pasting the unique transaction code from one app (browser app) to the user app, internally transferring the unique transaction code within the user device 170.

In item 310, after receiving the code 172 from the provider, the user can input a password or personal identification number (PIN) into the application running on the provider device. This is shown, for example, in FIG. 12 where the user app running on the user device 170 presents a screen on its graphic user interface that contains an entry field 188 for a password or PIN (and the user selects the submit menu option button 184 after entering their password or PIN). Again, the code 172 contains the unique transaction number and transaction details entered by the provider in item 302. Therefore, in one implementation, the methods and systems herein can display such transaction details (shown as items 186 in FIG. 12) for the user to review before the user enters their password PIN, and by executing the submit/pay button 184, the user indicates their consent to pay for the items shown on the user device 170 display.

As noted above, during registration, the user securely uploads personal and financial data to the intermediate entity 200, and such information is thereafter maintained by the intermediate entity 200 (which can be, for example, a bank or other similar institution, and can have highly sophisticated existing security systems). Such personal and financial information does not need to be (and in many implementations is not) stored in any form on the user device 170. Instead, the application running on the user device maintains a unique user account identifier that is only known by the user device and the intermediate entity, and similarly the application running on the provider device maintains a unique provider account identifier that is only known by the provider device and the intermediate entity.

This user account identifier is different than the user account number, but is used by the intermediate entity (e.g., through a look-up table maintained by the intermediate entity) to identify the user account number. The same is true for the provider account identifier and provider account number.

The user/provider account identifiers can be fixed data items (e.g., alphanumeric code) that are simply stored on the user/provider devices (in the user/provider apps stored at registration), or the user/provider identifiers can be data items that are generated each time they are requested (using a function that would produce a data result that the intermediate entity would expect to be produced). For example, in some implementations, a function could be applied to various hardware identifiers of the user/provider device that do not change (serial numbers of the processor, memory, hard drive, etc.) to produce a data value. During registration, the intermediate entity executes this function and stores the resulting data value (in electronic memory of the intermediate entity) as the user identifier to allow the intermediate entity to compare future user identifiers submitted during future transaction with the stored user identifier data value maintained by the intermediate entity to authenticate the user device. Therefore, in item 310, the user/provider do not need to enter any information except their password/PIN, because the remainder of the information that will identify the user/provider device is maintained (or generated) by the app running on the user/provider device (simplifying the user/provider experience and increasing user/provider satisfaction).

In item 312, the intermediate entity causes/controls (using the application) the registered provider device to encrypt the provider input (that is related to the transaction that is being completed between the provider device and the registered user device). This creates an encrypted one-time-use provider code, and such encryption is performed using a one-time-use provider encryption key produced, in part, using a uniquely sequenced number generated by the provider sequencer maintained by the provider device. More specifically, as noted above, each user/provider is provided one or more unique alphanumeric encryption strings during registration. The number generated/sequenced by the sequencers is used in combination with such unique alphanumeric encryption strings (that do not change and are not sequenced) and the combination of both the sequenced number and the unique alphanumeric encryption strings is applied to a hash function to generate the one-time-use encryption keys. This produces different one-time-use encryption keys for the user and provider, for a given transaction.

Again, the unique transaction number and the provider/user identification data are not encrypted, to allow the encrypted one-time-use provider code to be routed properly within the intermediate entity's internal system. However, the data that is encrypted includes the details of the transaction (e.g., price, quantity, item for which authorization is sought, etc., as shown by item 174) and can optionally include the user/provider account numbers that allow the intermediate entity verify the identity of the user or provider, an identification of the type of transaction (purchase vs. authorization), the contract identifier, selection of payment method (e.g., identification of a card type or bank name, without including any card numbers or bank account numbers), the next sequencer number, additional pins for different levels of access.

More specifically, the data that is encrypted first allows the intermediate entity to verify the identity of each party using, for example, the encrypted account numbers of the provider/user (which, as noted above, are distinguished from the unencrypted account identifiers). Therefore, in the situation where the provider it is only attempting to verify the identity of the user when providing access to a certain asset, the user account number and an identification of the access (or access level) being requested might be the only pieces of information that are encrypted. Along the same line, the user can be prompted by the user app to enter one or more additional passwords or pins into the user interface of the user device in order to gain different levels of access to an asset, and such additional passwords or pins would be encrypted to allow the provider to know whether to permit or deny certain levels of access.

In another example of the type of data that is encrypted, a user may have identified multiple bank accounts, bank cards, or credit cards that they would like to use for purchase transactions (during registration with the intermediate entity). In such a situation, the user app will provide a choice among such previously registered accounts or cards on the user device graphic user-interface when displaying the details of the purchase transaction. However, because sometimes the actual card and account numbers are not maintained on the user device for added security, the card numbers or bank account numbers may not be displayed on the user device graphic user interface and; instead, shorthand identifiers (e.g., "Card 1"; "Chase® Visa®"; "Amex® gold"; etc.) can be used in place of actual credit card numbers or bank account numbers on the graphic user interface of the user device. Therefore, rather than encrypting the actual card numbers or account numbers, the systems and methods herein encrypt such shorthand identifiers (substitute identifiers). The intermediate entity can maintain a lookup table that correlates such shorthand identifiers to the actual card numbers and bank account numbers (where such a lookup table is established during user registration).

As noted above, during registration each user and provider agrees to a specific contract, which is identified by the contract identifier. This contract identifier can be included within the encrypted data of the encrypted one-time-use code. By including the contract identifier within the encrypted information, the systems and method herein form a unique binding contract between each user and provider for each given transaction. Specifically, the intermediate entity maintains a record of the users/provider contract numbers for a given transaction, thereby forming an individual binding contract for each given transaction. This contract identification therefore changes the transaction from a "card not present" (cnp) transaction into an "out of scope" transaction where the person and payment card is verified, as a signature present transaction, which reduces or eliminates the risk of charge back to the provider delivering the access or good to the user.

Additionally, in some situations, they next sequencer number can be included within the encrypted portion of the encrypted one-time-use code. This allows the intermediate entity to verify that the sequencer within the user/provider app is synchronized with the duplicate app maintained by the intermediate entity. Additionally, in some situations, this could allow the intermediate entity to avoid maintaining its own sequencers.

Thus, when the user and provider register with the intermediate entity, the intermediate entity assigns each user and provider an individual account identifier, such as an alphanumeric string, that corresponds to the user's/provider's registered account with the intermediate entity, and this account identifier, along with the unique transaction number are left unencrypted so that the intermediate entity can identify which user and which provider are involved with a specific transaction. However, each user and each provider can also be provided with additional identification information (such as other alphanumeric codes, special names, user/provider device hardware identifiers (such as those noted above), etc., that are different than the unencrypted unique alphanumeric encryption strings used for encryption) at registration. Such additional identification information can be included within the encrypted portion of the one-time-use code. After decryption, the intermediate entity compares such previously encrypted additional identification information (e.g., the actual user/provider account number) with the corresponding data stored within the intermediate entity (at registration) to help verify the identity of the user and provider attempting to complete a transaction.

Therefore, as shown in item 314, instead of the user supplying any personal or financial information to the provider related to the transaction, the intermediate entity causes/controls the user device (using the user app) to encrypt user input related to the transaction to create an encrypted one-time-use user code using a one-time-use user encryption key produced, in part, using a uniquely sequenced number generated by a user sequencer maintained by the user device. As noted above, the combination of the sequenced number generated by the user's sequencer and the unique alphanumeric encryption strings provided to the user during registration are combined and applied to a hash function to generate the user's encryption key for the instant transaction. The user data that is encrypted can include the user's password/PIN (although such password/PIN is initially used locally to permit the user/provider app to perform the actions of encrypting and sending the one-time-use code) as well as the details of the transaction that the user received from the provider that was contained in the computer-readable code 172 (and possibly the additional identification information mentioned above); however, the unique transaction number and the user/provider account identifiers are not encrypted to allow the one-time-use user code to be routed properly within the intermediate entity's internal system.

Again, the encrypted one-time-use provider code and the encrypted one-time-use user code are devoid of personal financial information (e.g., user name, user address, bank account numbers, credit card numbers, social security numbers, date of birth, mother's maiden name, etc.) of the user, and instead such encrypted one-time-use codes are used to securely and positively identify the provider and user and the transaction details.

Again, in a purchase transaction, the encrypted one-time-use user code can also indicate a payment means. As part of the registration process with the program bank/intermediate entity, the user creates an "eWallet." For purchase transactions, the encrypted one-time-use user code can also identify which payment card or account is to be used to pay for the items (using substitute or shorthand names) if the user has registered multiple forms of payment with the intermediate entity. The user's one-time-use code is applied to this instruction as the user's electronic signature, verified, time-stamped and maintained as a transaction record by the bank/intermediate entity. The bank/intermediate entity, then processes this transaction as an "out-of-scope" transaction, as the account holder has been verified as present, the account has been verified, and the signature has been verified and stored.

As noted above, the user and the provider devices each only maintain a unique individual app/sequencer that is unique to each specific device, and the user and the provider devices do not have access to apps/sequencers of other user devices or other provider devices. The intermediate entity maintains a duplicate app/sequencer of each app/sequencer that is maintained by each user or provider device, and such duplicate sequencers are always synchronized with the unique individual sequencers of the user and provider devices. The synchronization is controlled by the fact that each time a sequencer is generated, a new and unique sequencer is prepared for the next use, according to a protocol established by the intermediate entity/bank at the time the user or provider apps are initially generated and electronically downloaded to the user/provider devices.

Therefore, the input provided in item 314 does not contain any personal information about the user (no name, address, credit card, bank account, etc., as such items have been previously supplied to the intermediate entity during registration) and, instead, the input in item 314 can relate only to the subject matter of the transaction (e.g., quantity, price, amount, access being requested, authorization being requested, etc.), identification of the user/provider, and identification of the transaction.

Thus, the intermediate entity/bank generates the app that is installed on each provider and user device. This app is remote and, when activated, generates a new one-time-use code (OTUC), encrypted, using the new sequencer as a unique encryption key, by the user's or provider's entry of their separate PINs, on their separate devices, at the end point of each transaction, causing the app to generate the OTUC and transmit it to the bank. Following this, a new sequence number will be generated by the app for the next transaction. The user/provider app that performs the process described herein is downloaded (electronically transmitted over a computer network) from the intermediate entity to the user and provider devices, after each registers with the intermediate entity (e.g., program bank or bank group/consortium). Each user and provider merely provides the unencrypted transaction identifier and their separate, unencrypted account identifier to allow proper routing of the encrypted data.

In other words, the user/provider app generates the codes from the registered user and provider account files, combined with a unique sequencer, also generated by the app, for each transaction. The sequencer, then, serves different purposes: first, it acts to change the value of the one-time-use code with each use; and, second, the sequencer, itself is used to generate the encryption key, which is why the bank has access the client file to retrieve the duplicate key, in order to decrypt the file. A purpose of the duplicate "sequencers," within each "duplicate app" maintained by the intermediate entity, is to generate the decryption code for the intermediate entity. The duplicate app and duplicate sequencer maintained by the intermediate entity allow the systems and methods herein to automatically generate a unique sequencer value as an encryption key for the user and provider together with a duplicate sequencer value for use by the intermediate entity/bank as a decryption key.

The automated mirroring/duplicating of the encryption keys, at separate points is produced by a unique set of processing instructions for each provider/user, which can be immediately accessed and paired with each transaction. This is why the user/provider identifiers are unencrypted and transmitted with the receipt of each encrypted one-time-use code. Each time a sequencer is used, a new and unique numerical sequence is generated. The user/provider account identifiers included in the encrypted file are used by the bank to verify the identities of parties and their intent with respect to each transaction. Once these identifiers are verified, they represent each party's verified electronic signature, as provided under the ESIGN Act of 2000. By identifying the parties (based on their signed, separate instructions through the contract identifiers to the intermediate entity) allows the intermediate entity to finalize each transaction, and holds the user/provider accountable for their performance under each transaction.

Figure 13:
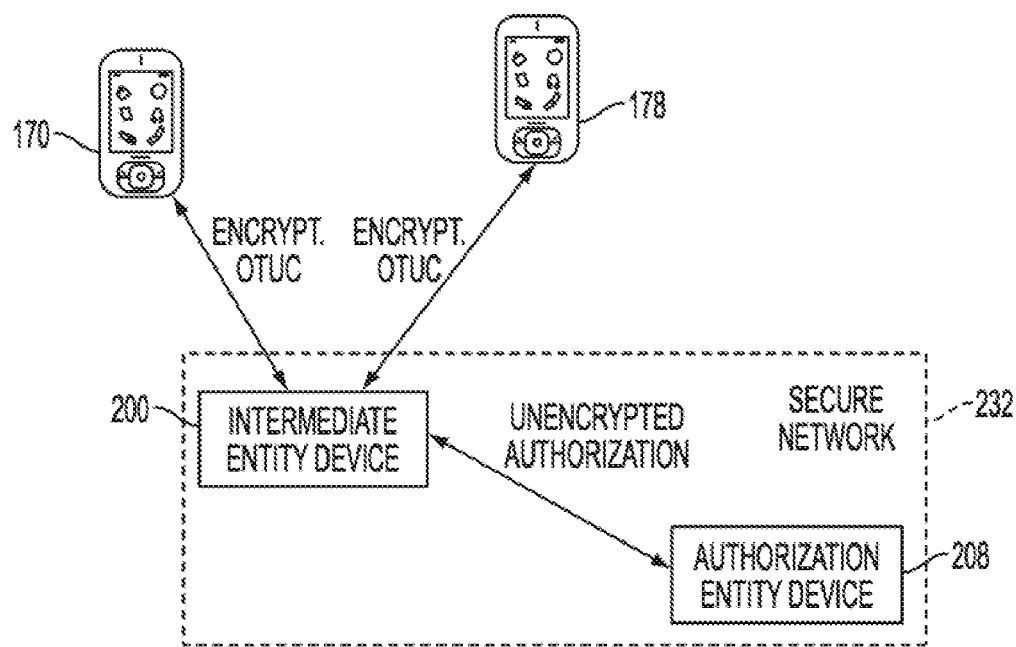
FIG. 13 is a schematic diagram illustrating systems used herein.

In item 316, the intermediate entity causes/controls the provider device (using the provider app) to transmit the one-time-use provider code, unique transaction number, and provider identifier only to the intermediate entity. Similarly, in item 318, the intermediate entity causes/controls the user device (using the user app) to transmit (independently of the provider device) the one-time-use user code, the unique transaction number, and the user identifier only to the intermediate entity. This is also shown in FIG. 13 where the user device 170 and the provider device 178 are both shown as transferring the encrypted one-time-use codes (Encrypt. OTUC) to the intermediate entity 200.

Again, the provider sequencer and the user sequencer generate different sequenced numbers used to produce encryption keys for the transaction. Also, the provider sequencer and the user sequencer are synchronized with the corresponding duplicate sequencers maintained by the intermediate entity. Thus, the provider sequencer, the user sequencer, and the duplicate sequencers not only generate a different encryption key for the user and provider for each transaction, they generate different one-time-use encryption keys for each different transaction to prevent any one-time-use encryption key from being used for different transactions.

In item 320, the intermediate entity independently generates (or regenerates) the one-time-use provider encryption key and the one-time-use user encryption key using corresponding ones of the duplicate sequencers maintained by the intermediate entity (and knowledge of the numerical strings issued to the user/provider during registration, and knowledge of the hash function). This allows the intermediate entity to decrypt the encrypted one-time-use provider code using the one-time-use provider encryption key and decrypt the encrypted one-time-use user code using the user unique encryption key in item 322. Thus, the intermediate entity/bank retrieves the decryption keys of the user and provider from the account files of each entity maintained by the intermediate entity, where each intermediate entity/bank client's duplicate app is stored. This desire to access the client's file is a reason for the client's "file identifier" to be transmitted unencrypted.

As a result of the decryption in item 322, the intermediate entity generates unencrypted provider input and unencrypted user input. With the decrypted provider and user information, the intermediate entity can check the user and provider registration records to verify the identities of the provider and user, as shown in item 324. If any registration issues with the user or provider are discovered in item 324 (e.g., lapsed registration, incorrect additional identification information (such as alphanumeric codes, special names, user/provider device hardware identifiers, etc. discussed above), violation of user/provider terms, etc.) notifications can be sent to the user/provider, and the transaction can be immediately terminated. If the identities of the user and provider are found to be proper in item 324, the intermediate entity combines the unencrypted provider input and unencrypted user input into a single authorization request in item 326.

The intermediate entity securely maintains the personal financial information of the user to relieve the user of that burden, and (in some situations) the intermediate entity (using the application) can even prevent the user device from maintaining any personal financial information of the user. However, in some situations, such as in payment authorization requests or bank transactions, the intermediate entity can retrieve financial information obtained during user/provider registrations in item 300 (that the intermediate entity securely maintains, such as a credit card number or bank account number), and add such financial information of the user and/or provider (potentially in unencrypted form) to the single authorization request in item 326 (that is sent to the authorization entity, such as the issuing bank).

As shown in FIG. 13, once the intermediate entity creates the single authorization request that contains the unencrypted user and/or provider information in item 326, the intermediate entity operates within a secure system 232 (e.g., operates behind a firewall or within some other form of secure network) and securely sends the single authorization request (unencrypted authorization) to an authorization entity 208 (such as the user's bank, an entity that verifies access rights, etc.); and this is shown in item 328 in FIG. 9. In other situations, especially non-purchase transactions, the intermediate entity can authorize the single authorization request; and in such situations, the intermediate entity is also the authorization entity and the intermediate entity can avoid sending the single authorization request to another entity because the intermediate entity determines the authorization itself.

Again, in terms of a purchase transaction, this request for authorization is processed to a payment network (e.g., Visa® or Mastercard®) to the card's issuing bank. The issuing bank, then, verifies whether or not the funds are available. If available, the request is approved. If the funds are not available, the bank declines the request. In terms of a non-purchase transaction (e.g., site access, identity verification, etc.) the intermediate entity/acquiring bank verifies the "request for authorization" transaction from the files and records maintained on its servers.

In response, the authorization entity returns an authorization decision in item 330 (which is shown by the double headed arrow between items 200 and 208 in FIG. 13). In some cases, the merchant processor may be the party advising the merchant that the transaction was approved or declined, not the acquiring bank/intermediate entity.

Figure 14:
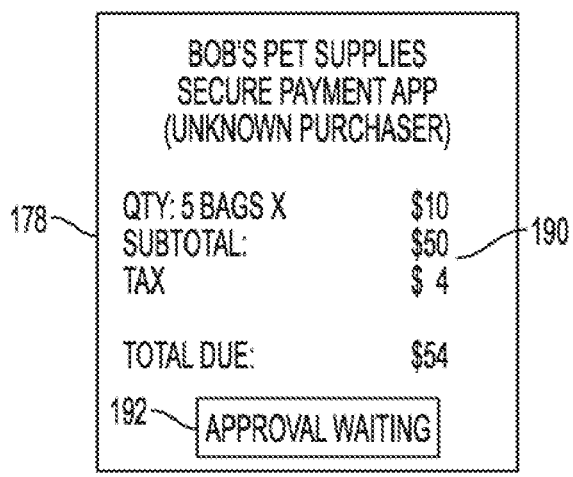
FIG. 14 is a schematic diagram illustrating screenshots provided herein.
Figure 15:
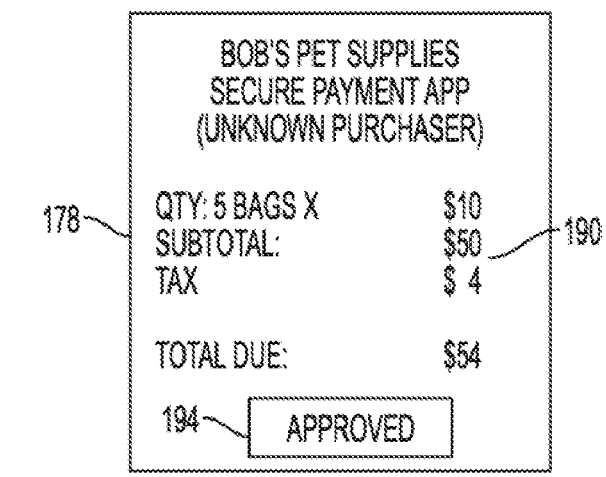
FIG. 15 is a schematic diagram illustrating screenshots provided herein.

After the intermediate entity obtains the authorization decision regarding the single authorization request from an authorization entity, the intermediate entity outputs the authorization decision to the provider and user in item 332 to complete or decline the transaction with the user. The authorization decision supplied to the provider in item 332 again is devoid of any user information (devoid of any user identification, user address, user personal financial information, etc.). For example, as shown in FIG. 14, the only information that is provided to the provider (through the provider app on the graphic user interface of the provider device 178) are details of the transaction 190, and an indicator 192 that approval is still awaiting approval (still pending). When the approval is transmitted from the intermediate entity device 200 to the provider device 178, the indicator changes to "Approved" as shown by item 194 in FIG. 15.

As noted, the methods and systems herein are useful in both purchase transactions and non-purchase transactions. In a purchase transaction, the provider and the user are authorizing/instructing the intermediate entity/bank by their electronic signature—using each OTUC—to verify the elements of the transaction, confirming the intent of each party and to transmit the request for authorization to the appropriate network and/or issuing bank as a confirmed card identified, person present, signature present transaction, holding each party responsible for their performance under the transaction. This is made possible by the bank's verification of each user and each provide at the time each opened their program account with the bank under the bank regulations governing the know-your-customer process.

Therefore, at the inception of the transaction in item 302 through to when the provider is notified of approval/denial of the transaction in item 332, the provider is never given any information about the user. By preventing the provider from ever obtaining any information about the user, the provider is freed of the responsibility and cost of keeping any user information safe, and the user is more confident that their identity and personal information is secure (because the provider is never made aware of any such user identity or user information).

Systems and methods herein permit the user to voluntarily divulge their identity to the provider (using the application) if they desire to, for example, maintain loyalty points, allow the provider to track usage/purchase patterns, allow the provider to provide coupons, etc. However, with methods and systems herein, the user is never required to divulge their identity or any other information to the provider.

Despite not knowing the identity of the user to the transaction, the provider is still guaranteed that the user will complete their obligations due under the transaction by way of the contract identifier (e.g., agrees to make payment, agrees that they are who they say they are, agrees that they are present to the transaction, aggress to use data to which they have access, agrees to take specific action) because the user contractually agrees to complete their obligations when they register as a user in item 300. Therefore, the provider is guaranteed that the user will complete their obligations under the transaction, and the user's identity and information is never presented to the provider with systems and methods herein.

As would be understood by one ordinarily skilled in the art, the processes described herein cannot be performed by human alone (or one operating with a pen and a pad of paper) and instead such processes can only be performed by a machine. Specifically, processes such as encryption, electronic transmission of data over networks, etc., requires the utilization of different specialized machines. Therefore, for example, the encryption/decryption performed by the user device cannot be performed manually (because it would take decades or lifetimes) and is integral with the processes performed by methods herein. Further, such machine-only processes are not mere "post-solution activity" because the encryption safeguards the data during electronic transmission and such data is further processed after it is transmitted and decrypted. Similarly, the electronic transmissions of each half of the transaction (the provider's half and the user's half) utilize special-purpose equipment (telecommunications equipment, routers, switches, etc.) that is distinct from a general-purpose processor. Also, the data transmission is integral with the process performed by the methods herein, and is not mere post-solution activity, because the post-transmission processes of the methods herein rely upon the previous transmission, and cannot be performed without such electronic transmission. In other words, these various machines are integral with the methods herein because the methods cannot be performed without the machines (and cannot be performed by humans alone).

Additionally, the methods herein solve many highly complex technological problems. For example, as mentioned above, providers suffer from the technological problem of not being fully capable of effectively safeguarding electronically stored user data on computer storage media (and data breaches of seemingly secure systems commonly occur).

Methods herein solve this technological problem by avoiding the need for providers to store any personal or financial information of the user (as such data is never supplied to the providers). This reduces the amount of electronic storage that a provider must maintain, and also reduces the technological security updates that a provider is required to satisfy. By granting such benefits to providers, the methods herein reduce the amount and complexity of hardware and software needed to be purchased, installed, and maintained by providers, thereby solving a substantial technological problem that providers experience today.

Similarly, with respect to the users, the methods herein additionally solve many technological problems related to the security of user information. By limiting the need for the user or the provider to maintain any personal or financial information of the user (as all such information can be maintained by secure data storage systems of the intermediate entity) hardware storage and software security elements for the user can be substantially reduced. In other words, because the user does not maintain any personal or financial information on the user device, the technology of the user device can be substantially simplified, thereby reducing cost, weight, size, etc., and providing many substantial technological benefits to the user.

Figure 16:
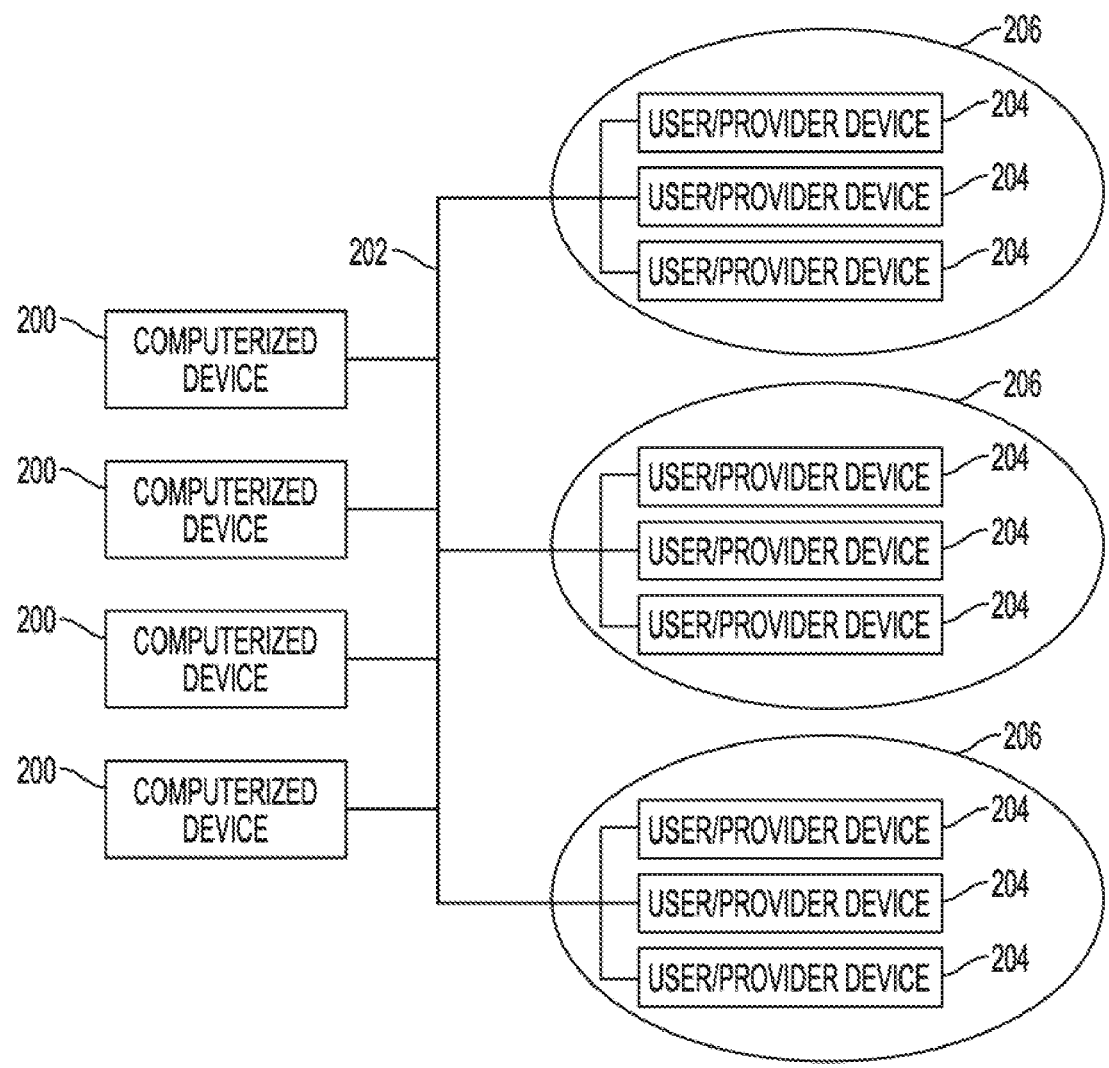
FIG. 16 is a schematic diagram illustrating systems herein.

As shown in FIG. 16, exemplary systems and methods herein include various computerized devices 200, 204 located at various different physical locations 206. The computerized devices 200, 204 can include portable devices (smart phones, smart watches, wearable computers, personal digital assistants (PDAs) tablets, laptops, convertibles, etc.), point-of-sale devices, personal computers, desktop computers, servers, mainframes, etc., and are in communication (operatively connected to one another) by way of a local or wide area (wired or wireless) network 202.

Figure 17:
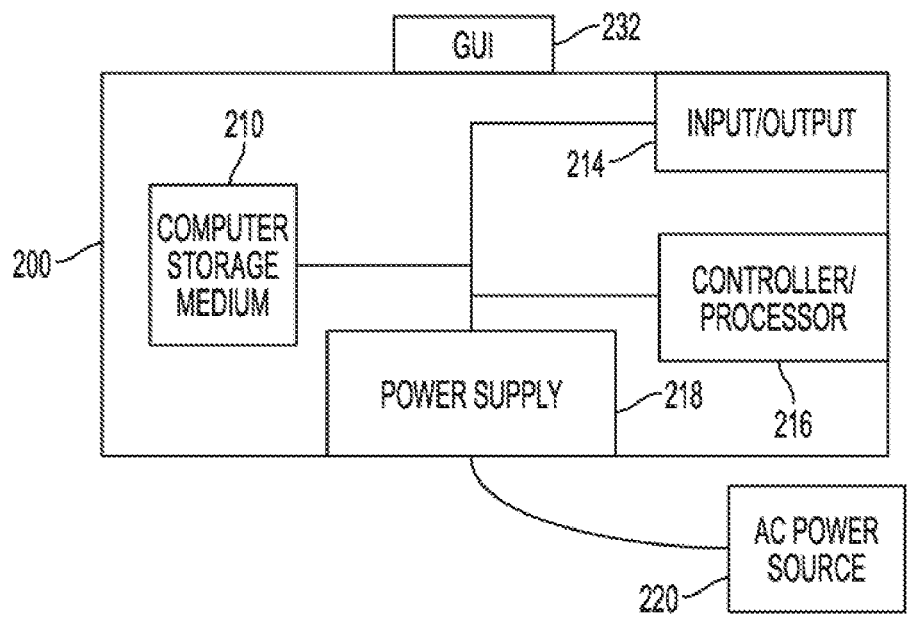
FIG. 17 is a schematic diagram illustrating devices herein.

FIG. 17 illustrates a computerized device 200, such as an intermediate entity which can be used with systems and methods herein and can comprise, for example, a server, a personal computer, a networked computing device, etc. The computerized device 200 includes a controller/tangible processor 216 and a communications port (input/output) 214 operatively connected to the tangible processor 216 and to the computerized network 202 external to the computerized device 200. Also, the computerized device 200 can include at least one accessory functional component, such as a graphical user interface (GUI) assembly 212. The user may receive messages, instructions, and menu options from, and enter instructions through, the graphical user interface or control panel 232.

The input/output device 214 is used for communications to and from the computerized device 200 and comprises a wired device or wireless device (of any form, whether currently known or developed in the future). The tangible processor 216 controls the various actions of the computerized device. A non-transitory, tangible, computer storage medium device 210 (which can be optical, magnetic, capacitor based, etc., and is different from a transitory signal) is readable by the tangible processor 216 and stores instructions (e.g., applications or apps) that the tangible processor 216 executes to allow the computerized device to perform its various functions, such as those described herein. Thus, as shown in FIG. 17, a body housing has one or more functional components that operate on power supplied from an alternating current (AC) source 220 by the power supply 218. The power supply 218 can comprise a common power conversion unit, power storage element (e.g., a battery, etc.), etc.

Figure 18:
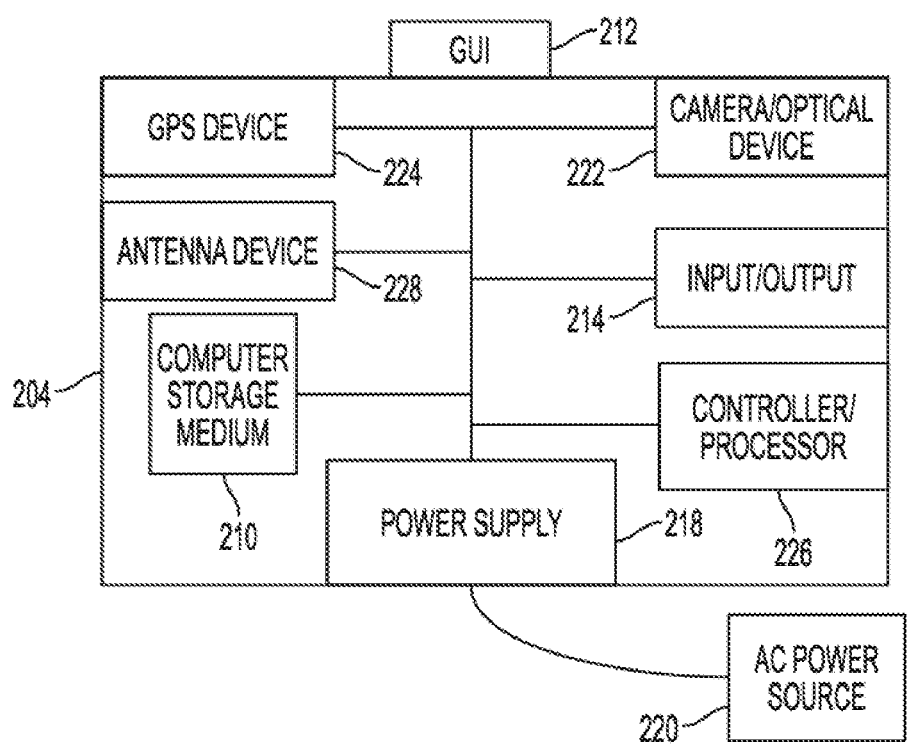
FIG. 18 is a schematic diagram illustrating devices herein.

FIG. 18 illustrates a computerized device 204, such as a user/provider computerized device, which includes many of the components mentioned above in FIG. 17 (and similar items are provided the same reference numeral in the drawings). The user/provider computing device 204 shown in FIG. 18 can comprise, for example, a special-use device such as a smart phone, tablet, or other special-purpose user/provider computerized element that is easily carried by a user. Such devices are special-purpose devices distinguished from general-purpose computers because such devices include specialized hardware, such as: specialized processors 226 (e.g., containing specialized filters, buffers, application specific integrated circuits (ASICs), ports, etc.) that are specialized for phone communications, for use with cellular networks, etc.; specialized graphic user interfaces 212 (that are specialized for reduced power consumption, reduced size, antiglare, etc.); antenna 228 (that are specialized for phone communications, for use with cellular networks, etc.); specialized converters; GPS equipment 224; cameras and optical devices 222 (that are specialized for obtaining images with camera components); specialized batteries; specialized protective cases for use in harsh environments; etc. Alternatively, item 204 can represent a specialized point-of-sale (POS) device located at a checkout of a physical store and can contain specialized ASIC circuitry, specialized bar code/glyph laser scanners, specialized receipt printers, weighing devices, conveyor belts, etc.

Thus, in a very simplified example, users download an app (which can be a general use version or a mobile version) from an acquiring program bank. At checkout, or the conclusion of the transaction in a non-purchase transaction, the user downloads, copies or otherwise enters the total amount of the transaction (assuming this is a purchase transaction) and the transaction identifier (which may be supplied by the provider). The provider and the user enter their PINs, activating the transmission of their "half" of the transaction to the bank (the apps are programmed to transmit the transaction to a specific bank site), and the bank pairs the two halves of the transaction, using the transaction identifier and each party's bank account program identifier to access the current encryption key of each. The bank verifies the unencrypted OTUCs, pairs them, and then either submits the request for authorization to the appropriate payment gateway (in the case of payment transactions) or verifies (or not) the transaction request directly (in the case of a non-purchase transaction).

In addition, the systems and methods herein can utilize a point-of-sale device 410 or terminal, which may include additional security features (such as chip readers, biometric readers, etc.) as shown in FIGS. 19-24. As technology advances beyond the fully manual credit card impression machines (e.g., "zip-zap" credit card devices) that pressure transfer the raised numbers on the front of a credit card onto carbon-paper packet copies, such point-of-sale credit card recording devices continue to improve in speed, accuracy, and the security. For example, many point-of-sale credit card devices may not only use contact magnetic heads to read that the magnetic strip located on the credit card, but such devices can also wirelessly communicate with circuitry of the credit cards (or wirelessly communicate with other user devices, such as smartphones, user-maintained radio frequency identification (RFID) devices, etc.). Also, point-of-sale devices can include biometric readers (retinal scanners, fingerprint readers, etc.) to help insure a match between the identity of the user and the owner of the credit card (the term, "credit card" herein generically refers to any payment or authorization card including, for example, credit cards, debit cards, prepaid cards, preloaded cards, direct financial payments (such as a direct payment from a bank account, etc.), access cards, etc.). The point-of-sale terminal 410 illustrated in the drawings is intended to include all such devices, whether currently known or developed in the future.

Figure 19:
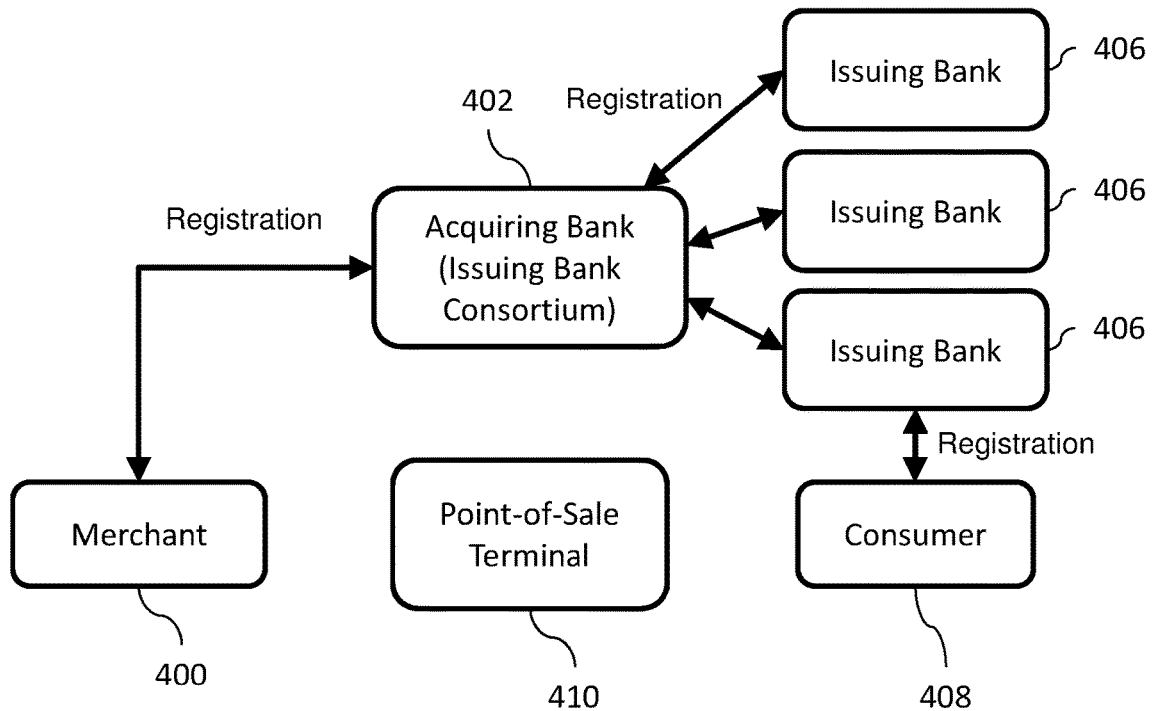
FIG. 19 is a schematic diagram illustrating systems used herein.

Another feature of systems herein is a consortium device 402 that is a computerized device or system owned and/or used by groups of financial institutions, financial clearing houses, resource controllers, verification entities, etc.; all of which are generically represented in the drawings as issuing banks 406. As shown in FIG. 19, while users or consumers 408 individually contract or subscribe to credit cards issued by different issuing banks 406, the issuing banks 406 and merchants 400 each join, or register with, the issuing bank consortium 402, which acts as an acquiring bank during various transactions that are conducted with the point-of-sale terminal 410. In other words, the "consortium device" is a generic term for the consortium of banks, and the consortium device 402 in the drawings represents the separate consortium or organization (and associated physical devices and assets) that is created, and subscribed to, by the various independent and separate member issuing banks 406. Therefore, the bank consortium 402 is a cooperative organization that can be a stand-alone entity, separate from any of the individual issuing banks 406, to which each of the issuing banks 406 becomes a member, by subscribing or joining the consortium.

Thus, the consortium 402 acts in concert to verify, authorize, and finalize each transaction of its entire member issuing banks 406. Additionally, the consortium 402 stores a complete copy of each transaction, including each party's one-time-use code. The bank consortium 402 can be used for non-payment activities, such as access authorization, HIPPA compliance, etc., performed either by the bank consortium or a non-bank, authorized/licensed entity such as a cloud operator, hospital, etc.

One feature of the structure shown in FIGS. 19-24 is that when the user 408 initiates the one-time-use code from their device, that one-time-use code is sent directly from the point-of-sale terminal 410 to the acquiring bank (bank consortium device) 402, without being handled by an intermediate payment processor or other third-party aggregator. This includes, not just in-person (i.e., physically at the point-of-sale terminal 410), but also transactions remotely transmitted to a provider's site (e.g., online or other forms of remote/cyber transmissions, which may be processed by the provider separately from the point-of-sale terminal, allowing for all known and later developed system applications for accepting the terms of payment).

Therefore, the consortium device 402 can have its own dedicated hardware (computer servers, switches, computer networks, storage devices, etc.) and is a system that combines the activity of all of its member financial institutions to allow the consortium device 402 to act both as an acquiring bank and as an issuing bank to immediately approve transactions submitted to the bank consortium 402 by a point-of-sale terminal 410, using the records of users and providers maintained controlled by the member financial institutions. The records of the member banks can be stored on the consortium server(s) such that each transaction is efficiently completed by the consortium, on behalf of each member bank.

In operation, consistent with the previous disclosure presented above, the consortium device 402 maintains duplicate sequencers used in producing one-time-use encryption keys for registered user devices 408 and registered provider devices 400. Also, after the registration process shown in FIG. 19, the consortium device 402 securely maintains personal financial information of the user. The consortium device 402 can even prevent the user device 408 from maintaining the personal financial information, to avoid theft or loss of such data from the less secure user device 408. The point-of-sale terminal 410 can accommodate electronic payment signals (e.g., initiated with a "tap," from the user's smartphone, where the tap initiates the signal). This also allows the TSE transaction code to be sent and accepted as an electronic signal. Thus, with systems and methods herein, users 408 may register their provider loyalty memberships with the consortium device 402, directly or through the issuing banks 406. As such, any transaction with any provider, with whom the user is registered, may automatically be reflected/included on the user's and the provider's transaction receipts, allowing the provider to update the user's loyalty account, without exposing any user information, including the user's name. As can be seen from the foregoing, this allows the banks to control the financial side of transactions without exposing user's personal or financial information.

The consortium device 402 causes (e.g., through applications or apps) a provider device 400, of the registered provider devices 400, to encrypt provider input related to a transaction between the provider device 400 and a user device 408, of the registered user devices 408. Thus, the provider device 400 creates an encrypted one-time-use provider code using a one-time-use provider encryption key, identifying the provider, the transaction, and the provider's agreement to the transaction, produced, in part, using a uniquely sequenced number generated by a provider sequencer maintained by the provider device 400.

The consortium device 402 similarly causes (e.g., through applications or apps) the user device 408 to encrypt user input related to the transaction to create an encrypted one-time-use user code using a one-time-use user encryption key, identifying the provider, the transaction, and the user's agreement to the transaction, produced, in part, using a uniquely sequenced number generated by a user sequencer maintained by the user device 408. The user input provided by the user can include other user information, such as a user or customer loyalty or rewards program identification. This allows the customer loyalty or rewards program identification to be included within the encrypted one-time-use user code to permit the consortium device 402 to forward or keep track of customer loyalty or reward program points.

The user devices 408 and the provider devices 400 each only maintain a unique individual sequencer, and the user devices 408 and the provider devices 400 do not have access to sequencers of other user devices 408 or other provider devices 400. The provider sequencer and the user sequencer produce different encryption keys for the transaction. The provider sequencer and the user sequencer are synchronized with corresponding ones of the duplicate sequencers maintained by the consortium device 402. Also, the provider sequencer, the user sequencer, and the duplicate sequencers produce different one-time-use encryption keys for each different transaction to prevent any one-time-use encryption key from being used for different transactions. The encrypted one-time-use provider code and the encrypted one-time-use user code are devoid of personal financial information of the user.

Figure 20:
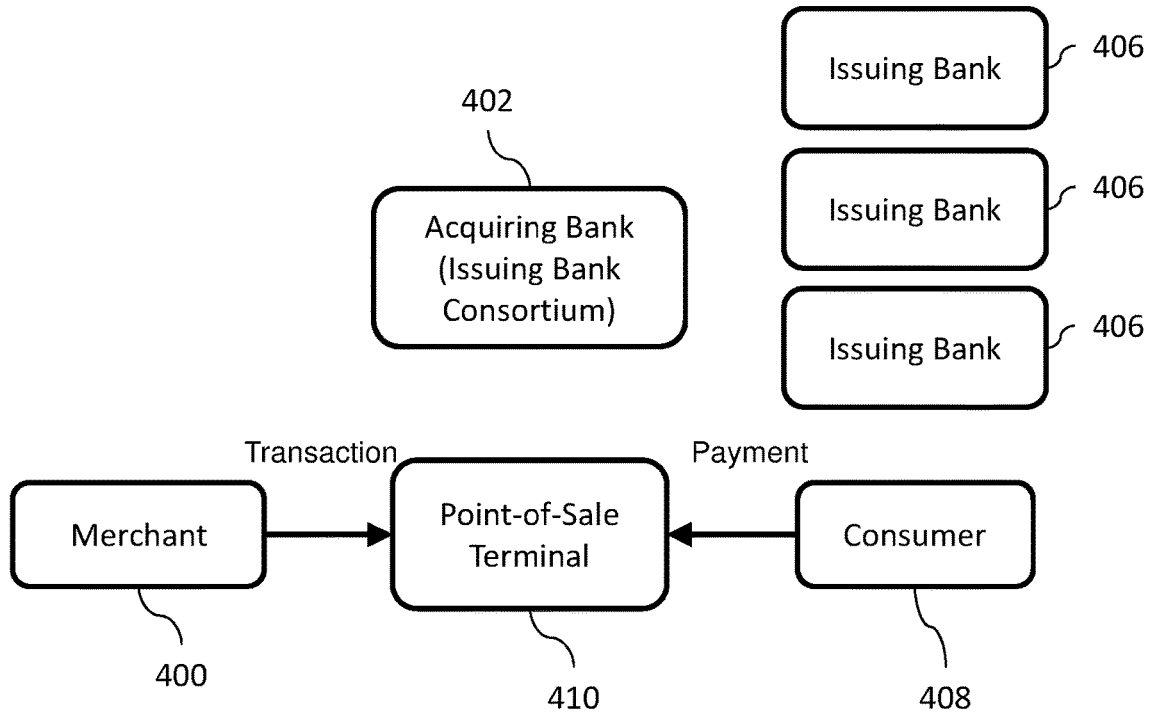
FIG. 20 is a schematic diagram illustrating systems used herein.
Figure 21:
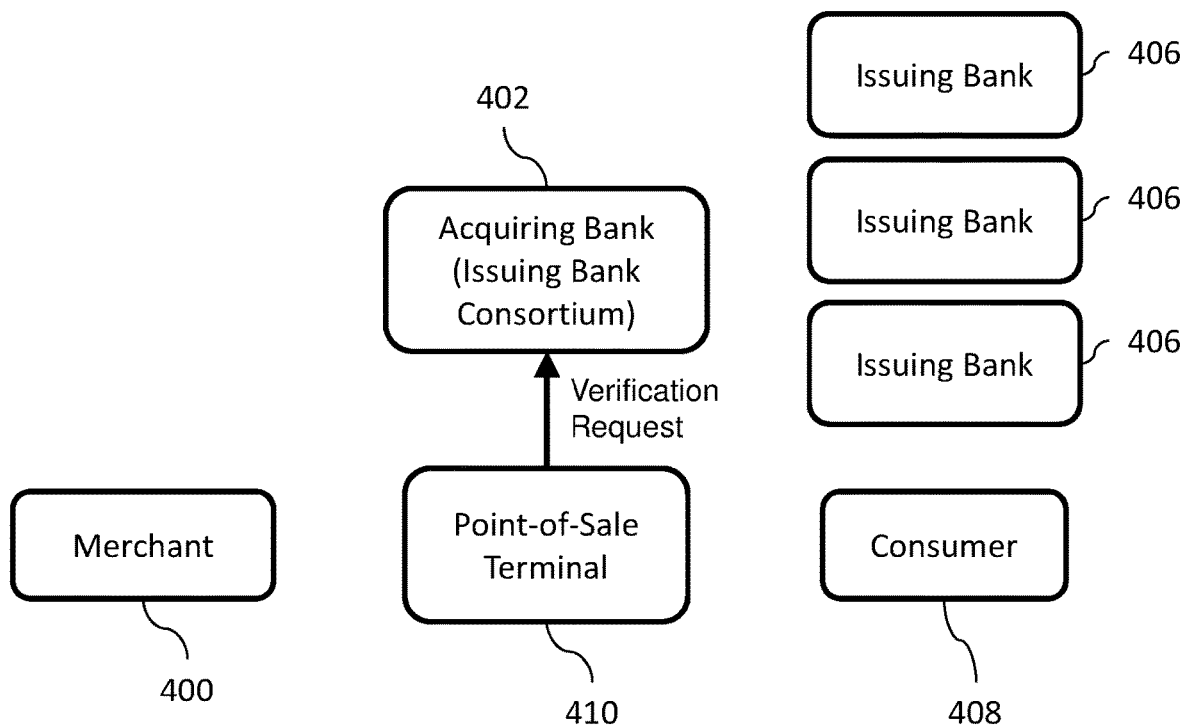
FIG. 21 is a schematic diagram illustrating systems used herein.

As shown in FIG. 20, the provider device 400 and the user device 408 independently supply the encrypted one-time-use provider code and the encrypted one-time-use user code to the point-of-sale device 410. As shown in FIG. 21, the point-of-sale device 410 transmits the encrypted one-time-use provider code and the encrypted one-time-use user code to the consortium device 402.

Figure 22:
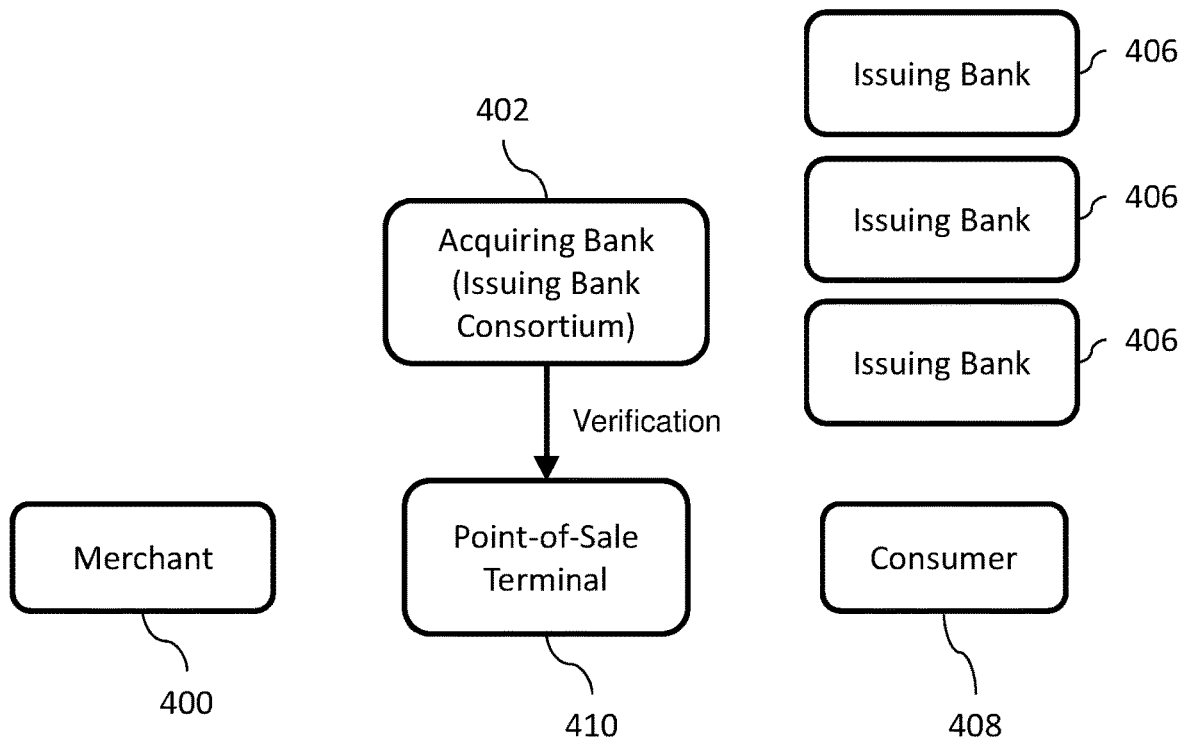
FIG. 22 is a schematic diagram illustrating systems used herein.
Figure 23:
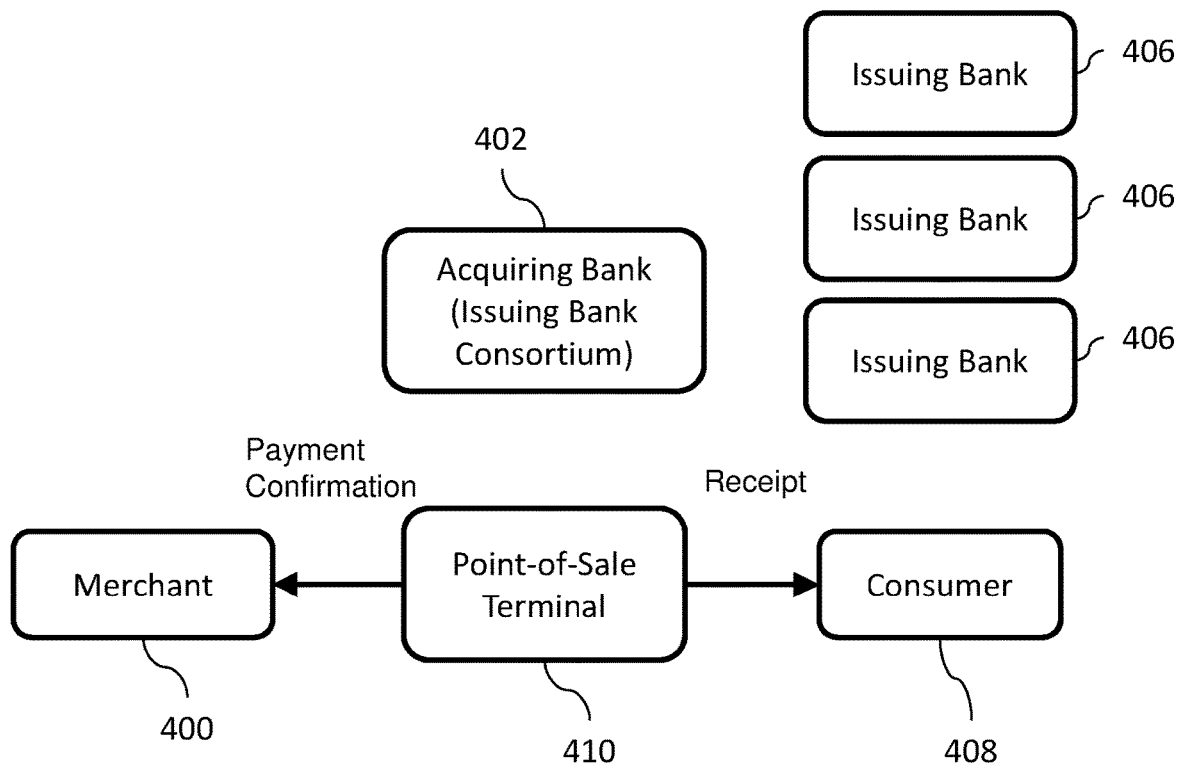
FIG. 23 is a schematic diagram illustrating systems used herein.

The consortium device 402 decrypts the encrypted one-time-use provider code and decrypts the encrypted one-time-use user code using one-time-use encryption keys (independently produced using corresponding ones of the duplicate sequencers maintained by the consortium device 402) to generating an authorization request of unencrypted provider input and unencrypted user input. The consortium device 402 generates an authorization decision in response to the authorization request, based upon the consortium device's 402 ability to verify the identity and intent of each party, and transmits the authorization decision to the point-of-sale device 410, as shown in FIG. 22. The point-of-sale device 410 in turn outputs the authorization decision to the provider device 400 and the user device 408, as shown in FIG. 23.

Thus, the paired user and provider one time use codes are decrypted, verified, and immediately cleared and finalized by the banks consortium 402, with the result ("approved" or "declined") being transmitted (immediately) to the provider/merchant 400, which provides a more streamlined version of the handling of transactions. This also allows an immediate reconciliation/clearing of transactions between the issuing and acquiring "consortium 402" member banks, simultaneous authorization of each verified payment transaction. This also provides for "clearing" of other types of financial transactions among and between the "consortium 402" member banks, such as check clearing, without any processing external to the computerized devices maintained by the bank consortium 402 (without transmitting any information or requests to intermediate clearing houses or external issuing banks).

Figure 24:
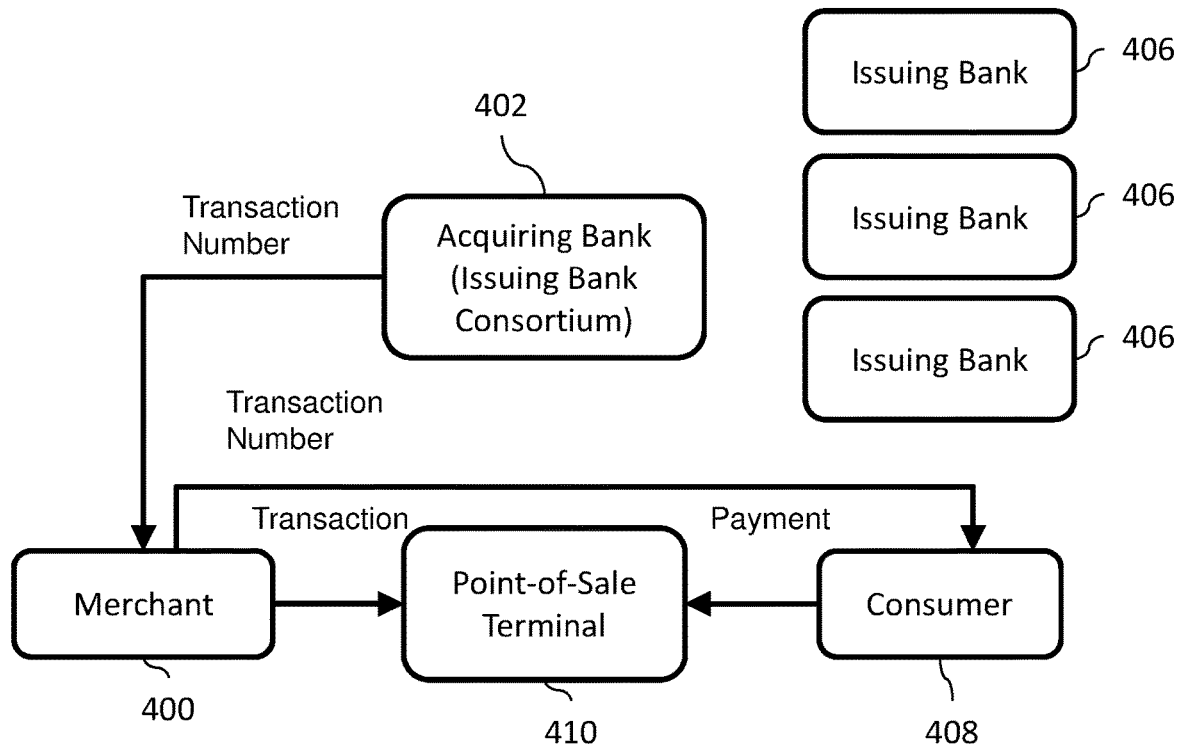
FIG. 24 is a schematic diagram illustrating systems used herein.

In other implementations, shown in FIG. 24, the consortium device 402 causes the provider device 400 to supply a unique transaction number to the user device 408. The unique transaction number can be self-generated by the provider device 400 or can be supplied to the provider by the consortium device 402. The provider device 400 supplies a different unique transaction number for each different transaction.

The provider device 400 can supply the unique transaction number to the user device 408 in many different ways. For example, the provider can display a computer-readable code that is readable by an optical device of the user device 408; can display a human-readable code positioned to be readable by the user (where the user manually enters the human-readable code into the user device 408); can wirelessly transmit a code using a wireless device of the provider device 400 capable of wirelessly communicating with a wireless device of the user device 408; can internally communicate the unique transaction number from a first application operating on the user device 408 to a second application operating on the user device 408; etc.

In this implementation, the provider device 400 supplies the one-time-use provider code and the unique transaction number only to the point-of-sale device 410, and similarly the user device 408 supplies the one-time-use user code and the unique transaction number only to the point-of-sale device 410. Consistent with the foregoing, the point-of-sale device 410 transmits the encrypted one-time-use provider code, the unique transaction number, and the encrypted one-time-use user code to the consortium device 402.

Figure 25:
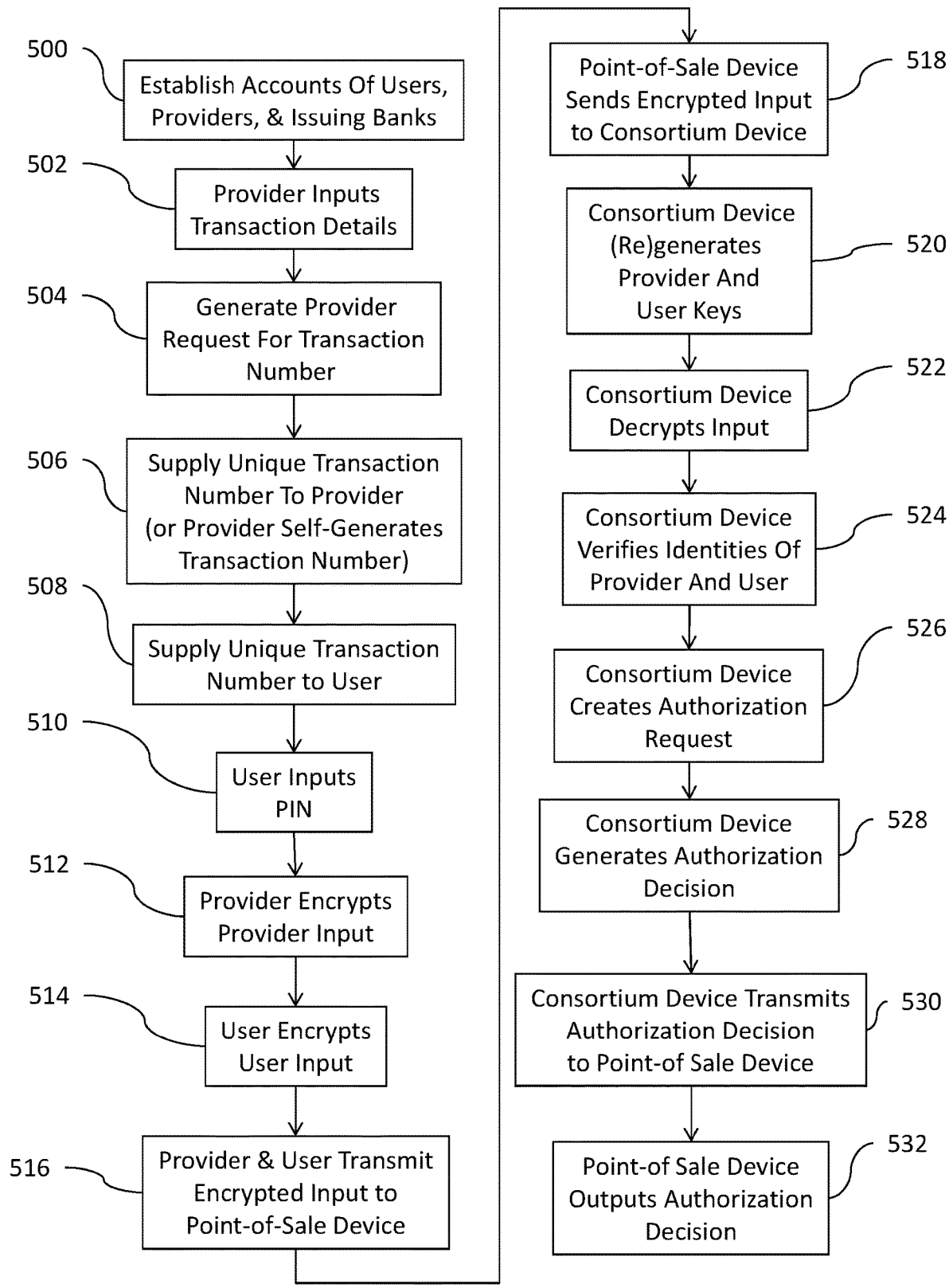
FIG. 25 is a flow diagram of various methods herein.

The processing of FIGS. 19-24 is also shown in flowchart form in FIG. 25. In item 500, these methods establish accounts of registered users through registered user devices, accounts of registered providers through registered provider devices, and the financial institutions (issuing banks) register with the consortium device. With these methods, the consortium device securely maintains the personal financial information of the user, preventing the user device from maintaining such personal financial information. Also, with such methods, the consortium device maintains duplicate sequencers used in producing one-time-use encryption keys for the registered user devices and the registered provider devices.

In item 502, the provider inputs various details about the transaction (e.g., quantity, price, amount, terms and agreement as to terms of sale, access being requested, authorization being requested, etc.) into the application running on the provider device. In item 504, a registered provider device can use its provider application to request a new transaction number for a new transaction between that provider and one of the registered users. Alternatively, in item 506, the provider app can self-generate a unique transaction number that the intermediate entity would expect (by way of the duplicate app to the provider app maintained by the intermediate entity).

Additionally, in such methods, the consortium device causes (e.g., through applications or apps) the provider device to supply a unique transaction number to the user device in item 508. The provider device supplies a different unique transaction number for each different transaction. To execute item 508, the provider device can display a computer-readable code on a display of the provider device that is readable by an optical device of the user device; the provider device can display a human-readable code on the display of the provider device positioned to be readable by the user (where the user manually enters the human-readable code into the user device); the provider device can wirelessly transmit a code using a wireless device of the provider device capable of wirelessly communicating with a wireless device of the user device; the provider device can internally communicate the unique transaction number from a first application operating on the user device to a second application operating on the user device; etc. In item 510, after receiving the code from the provider in item 508, the user can input a password or personal identification number (PIN) into the application running on the user device (or otherwise activate the transmission of the one-time-use code from the user's device to the provider's terminal, site, etc.). However, the inputting of a PIN by the user on the provider's device only provides an approximate "signature" acceptance to the terms; while, to the contrary, the one-time-use code generated by systems and methods herein is a verifiable signature that actually identifies and binds the parties to each transaction, and is therefore processed as person present, card verified, signature present and verified transaction, rather than as a card-not-present transaction. This allows the systems and methods herein to be used for in-person transactions by transmitting the one-time-use code, as a signal, to the bank consortium 402.

Further, in item 512, in such methods the consortium device causes the provider device to encrypt provider input related to the transaction to create an encrypted one-time-use provider code using a one-time-use provider encryption key produced, in part, using a uniquely sequenced number generated by a provider sequencer maintained by the provider device.

Similarly, in item 514, in these methods the consortium device causes (e.g., through applications or apps) the user device, activated by the user, to encrypt user input related to the transaction to create an encrypted one-time-use user code using a one-time-use user encryption key produced, in part, using a uniquely sequenced number generated by a user sequencer maintained by the user device.

The user devices and the provider devices each only maintain a unique individual sequencer, and the user devices and the provider devices do not have access to sequencers of other user devices or other provider devices. The provider sequencer and the user sequencer therefore produce different encryption keys for the transaction. The provider sequencer and the user sequencer are synchronized with corresponding ones of the duplicate sequencers maintained by the consortium device. The provider sequencer, the user sequencer, and the duplicate sequencers produce different one-time-use encryption keys for each different transaction to prevent any one-time-use encryption key from being used for different transactions. Further, the encrypted one-time-use provider code and the encrypted one-time-use user code are devoid of personal financial information of the user.

Further, in item 516, in such methods the provider device supplies the encrypted one-time-use provider code and the unique transaction number, and the user device supplies the encrypted one-time-use user code and the unique transaction number only to the point-of-sale device. In item 518, the point-of-sale device transmits the encrypted one-time-use provider code, the unique transaction number, and the encrypted one-time-use user code to the consortium device.

Also, as shown in item 520, with such methods the consortium device independently generates the one-time-use provider encryption key and the one-time-use user encryption key using corresponding ones of the "duplicate sequencers" maintained by the consortium device. Then, in item 522, the consortium device decrypts the encrypted one-time-use provider code using the one-time-use provider encryption key and decrypts the encrypted one-time-use user code using the user unique encryption key to generate unencrypted provider input and unencrypted user input. Each one-time-use code contains a sequence that does not need to be encrypted and does not change. This sequence identifies the paired "duplicate sequencers" maintained by the consortium device.

With the decrypted provider and user information, the consortium device can check the user and provider registration records to verify the identities of the provider and user, as shown in item 524. If any registration issues with the user or provider are discovered in item 524 (e.g., lapsed registration, incorrect additional identification information (such as alphanumeric codes, special names, user/provider device hardware identifiers, etc., discussed above), violation of user/provider terms, etc.) notifications can be sent to the user/provider, and the transaction can be immediately terminated.

If the identities of the user and provider are found to be proper in item 524, the consortium device combines the unencrypted provider input and unencrypted user input into an authorization request in item 526. With such methods, in item 528, the consortium device generates an authorization decision in response to the authorization request and transmits the authorization decision to the point-of-sale device in item 530. Next, in these methods, the point-of-sale device outputs the authorization decision to the provider device and the user device in item 532.

Figure 26:
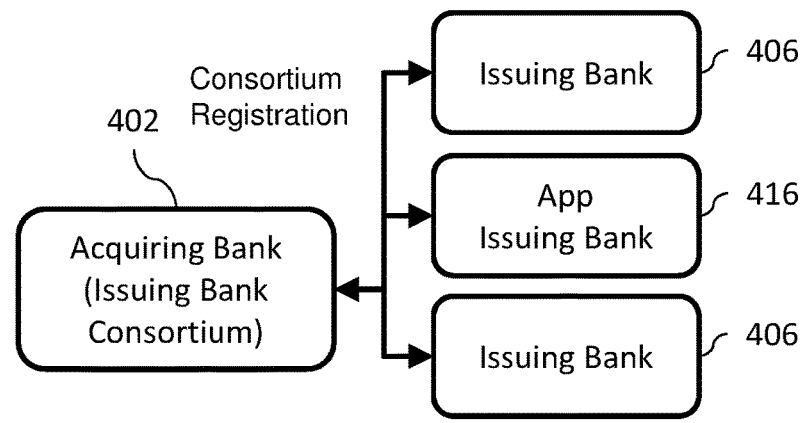
FIG. 26 is a schematic diagram illustrating systems used herein.
Figure 26:
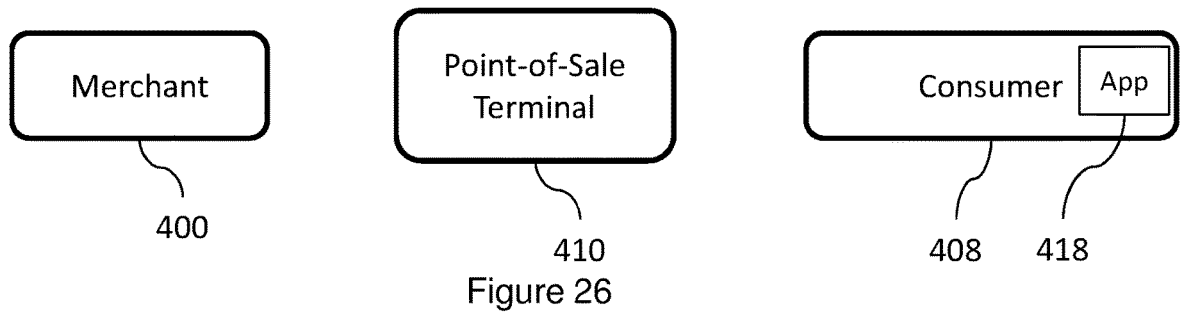

In addition, the systems and methods herein can utilize a point-of-sale device 410 or terminal in combination with a provider institution app 418 operating on the user's device, as shown in FIGS. 26-34. The provider institution app 418 is a software application (commonly known as a smartphone "app") that operates or runs on the user's device 408 and causes the user's device 408 to take various actions and perform various processes. The provider institution app 418 is created, supplied (e.g., downloaded from), maintained, and owned by a financial institution that often shares its name with the merchant 400, and such a financial institution is referred to in the drawings and in this text sometimes as the app issuing bank 416. Retailers sometimes contract with banks, with respect to their payment card programs. This allows the retailer to provide credit to customers from its "bank" and issue credit and debit cards from its "bank"; and all such forms of institutions are intended to be illustrated by the app issuing bank 416 in the drawings. As with the other issuing banks 406 described above, the app issuing bank 416 registers with the consortium 402, which acts as an acquiring bank during various transactions that are conducted with the point-of-sale terminal 410, as shown in FIG. 26.

Figure 27:
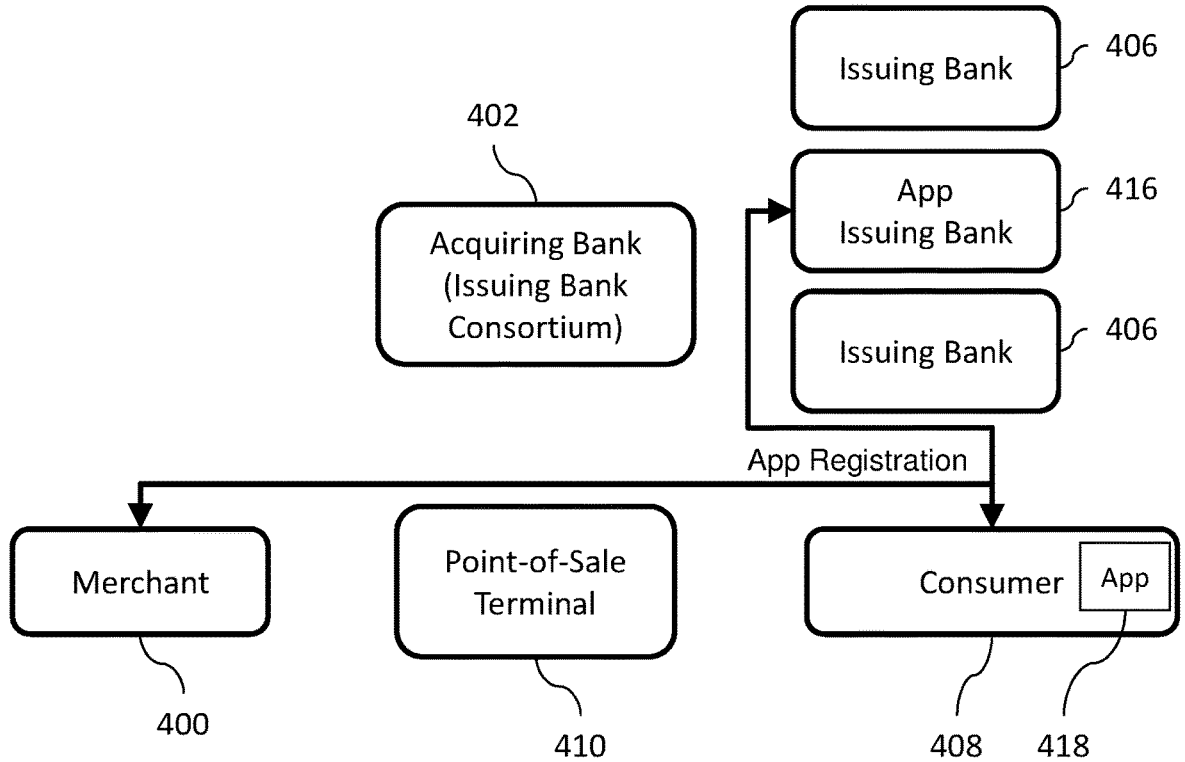
FIG. 27 is a schematic diagram illustrating systems used herein.

The user downloads the provider institution app 418 to their portable device (e.g., smartphone) 408 from an intermediary such as an app store, or directly from the bank consortium 402 or the app issuing bank 416. As shown in FIG. 27, using the provider institution app 418, the user registers with the merchant 400 and/or the app issuing bank 416 by providing various information, as described above, through the provider institution app 418.

In operation, consistent with the disclosure presented above, the consortium device 402 maintains duplicate sequencers used in producing one-time-use encryption keys for registered user devices 408 and registered provider devices 400. Also, after the registration process shown in FIG. 27, the consortium device 402 and app issuing bank 416 securely maintain personal financial information of the user. The consortium device 402 can even prevent the user device 408 and registered provider devices 400 from maintaining the personal financial information, to avoid theft or loss of such data from the less secure user device 408. As discussed above, with systems and methods herein, users 408 may register their provider loyalty memberships with the consortium device 402, using the provider institution app 418. As such, any transaction with any provider, with whom the user is registered, may automatically be reflected/included on the user's and the provider's transaction receipts, allowing the provider to update the user's loyalty account, without exposing any user information, including the user's name. As can be seen from the foregoing, this allows the banks to control the financial side of transactions without exposing user's personal or financial information.

Figure 28:
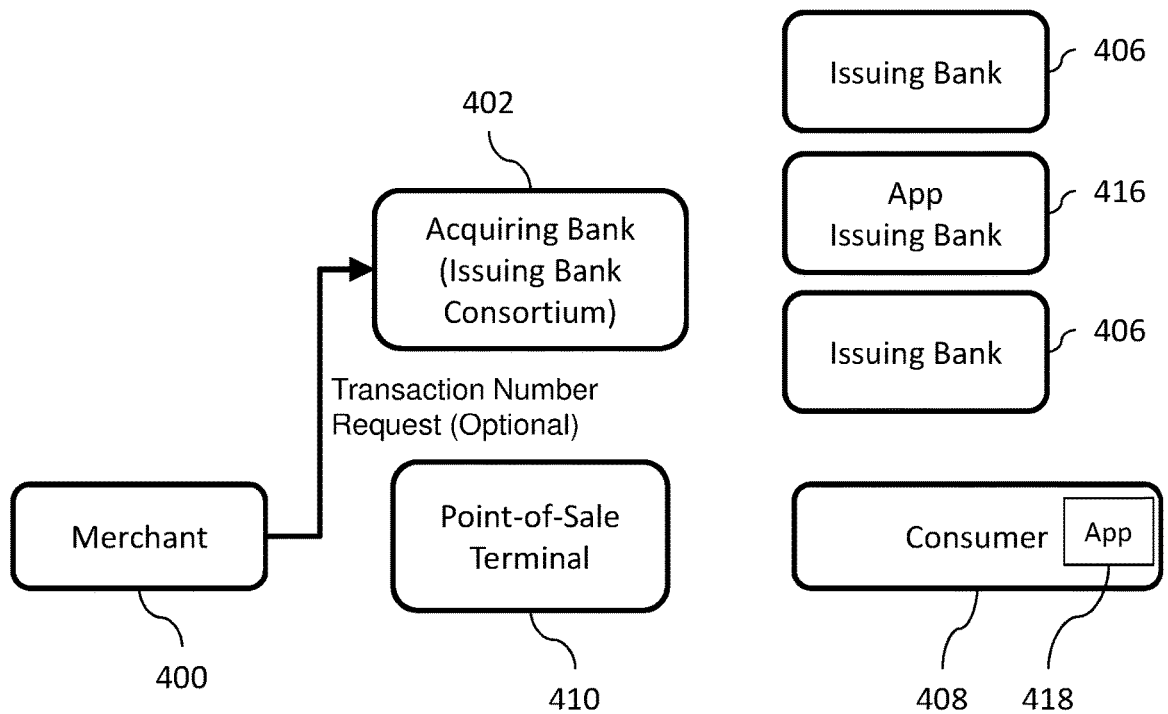
FIG. 28 is a schematic diagram illustrating systems used herein.
Figure 29:
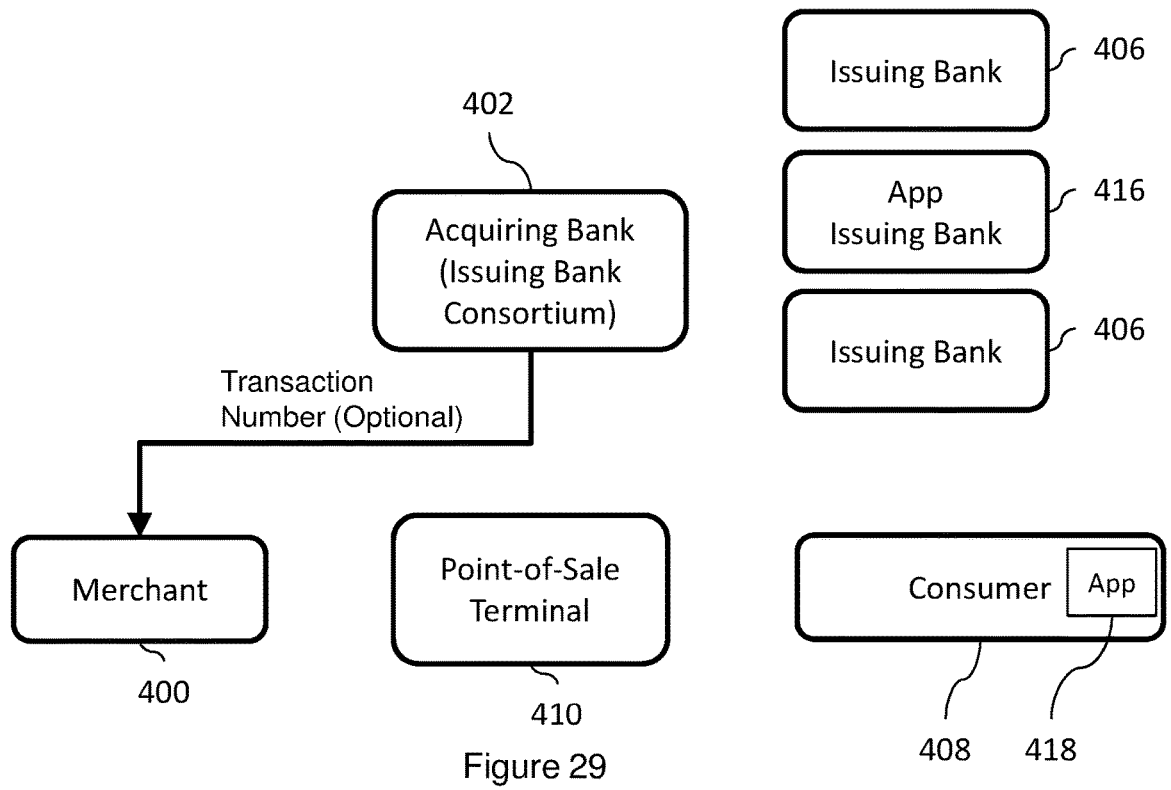
FIG. 29 is a schematic diagram illustrating systems used herein.

As shown in FIG. 28, the merchant 400 can optionally request a transaction number from the consortium device 402 (and receive the same back in FIG. 29) or, as described above, the merchant 400 can self-generate the transaction number.

Figure 30:
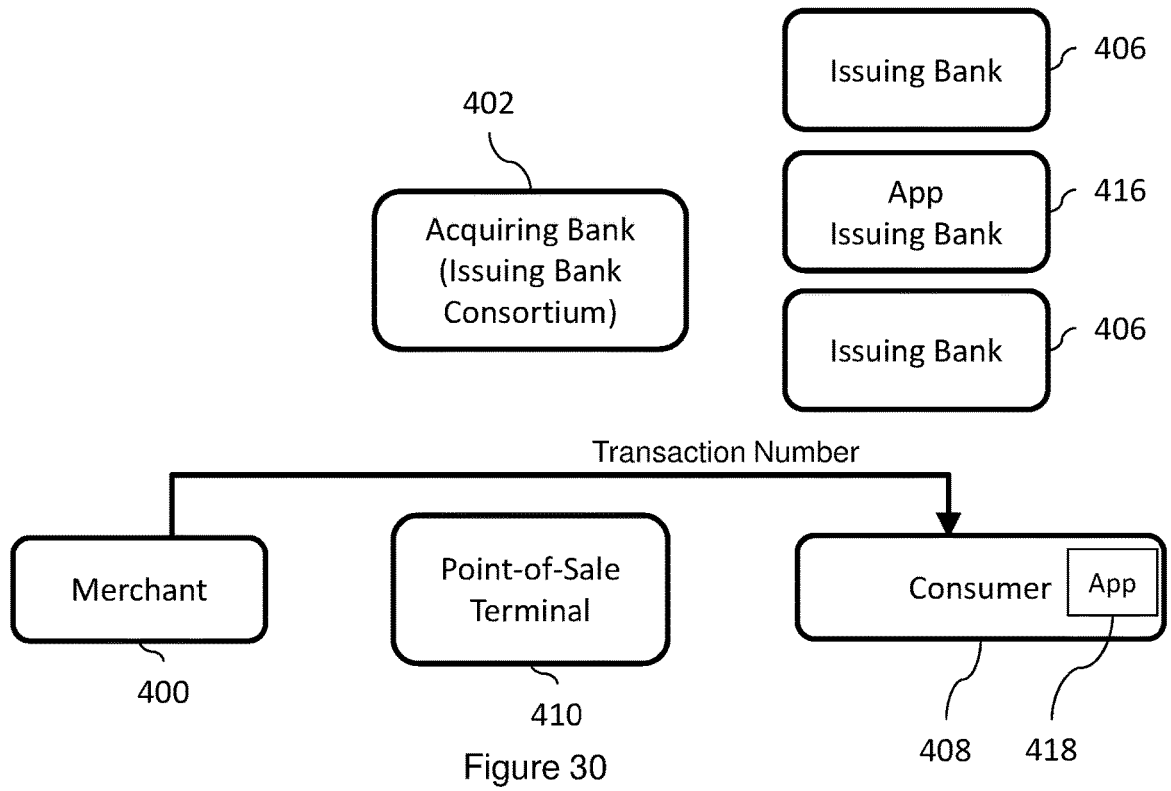
FIG. 30 is a schematic diagram illustrating systems used herein.

As also shown in FIG. 30, and as discussed above, the merchant or provider device 400 supplies the unique transaction number to the provider institution app 418 operating on the user's device 408. The provider device 400 supplies a different unique transaction number for each different transaction. For example, the provider device 400 can display a computer-readable code on a display of the provider device 400 that is readable by an optical device of the user device 408; the provider device 400 can display a human-readable code on the display of the provider device 400 positioned to be readable by the user (where the user manually enters the human-readable code into the provider institution app 418 operating on the user's device 408); the provider device 400 can wirelessly transmit a code using a wireless device of the provider device 400 capable of wirelessly communicating with a wireless device of the user device 408; the provider device 400 can internally communicate the unique transaction number from the provider institution app 418 operating on the user's device 408 to a second application operating on the user device 408; etc.

The consortium device 402 causes (e.g., through applications or apps) a provider device 400, of the registered provider devices 400, to encrypt provider input related to a transaction between the provider device 400 and a user device 408, of the registered user devices 408. Thus, the provider device 400 creates an encrypted one-time-use provider code using a one-time-use provider encryption key, identifying the provider, the transaction (using the transaction number), and the provider's agreement to the transaction, produced, in part, using a uniquely sequenced number generated by a provider sequencer maintained by the provider device 400.

The consortium device 402 similarly causes (e.g., through the provider institution app 418) the user device 408 to encrypt user input related to the transaction to create an encrypted one-time-use user code using a one-time-use user encryption key, identifying the provider, the transaction, and the user's agreement to the transaction, produced, in part, using a uniquely sequenced number generated by a user sequencer maintained by the user device 408. The user input provided by the user can include other user information, such as a user or customer loyalty or rewards program identification. This allows the customer loyalty or rewards program identification to be included within the encrypted one-time-use user code to permit the consortium device 402 to forward or keep track of customer loyalty or reward program points.

The user devices 408 and the provider devices 400 each only maintain a unique individual sequencer, and the user devices 408 and the provider devices 400 do not have access to sequencers of other user devices 408 or other provider devices 400. The provider sequencer and the user sequencer produce different encryption keys for the transaction. The provider sequencer and the user sequencer are synchronized with corresponding ones of the duplicate sequencers maintained by the consortium device 402. Also, the provider sequencer, the user sequencer, and the duplicate sequencers produce different one-time-use encryption keys for each different transaction to prevent any one-time-use encryption key from being used for different transactions. The encrypted one-time-use provider code and the encrypted one-time-use user code are devoid of personal financial information of the user.

Figure 31:
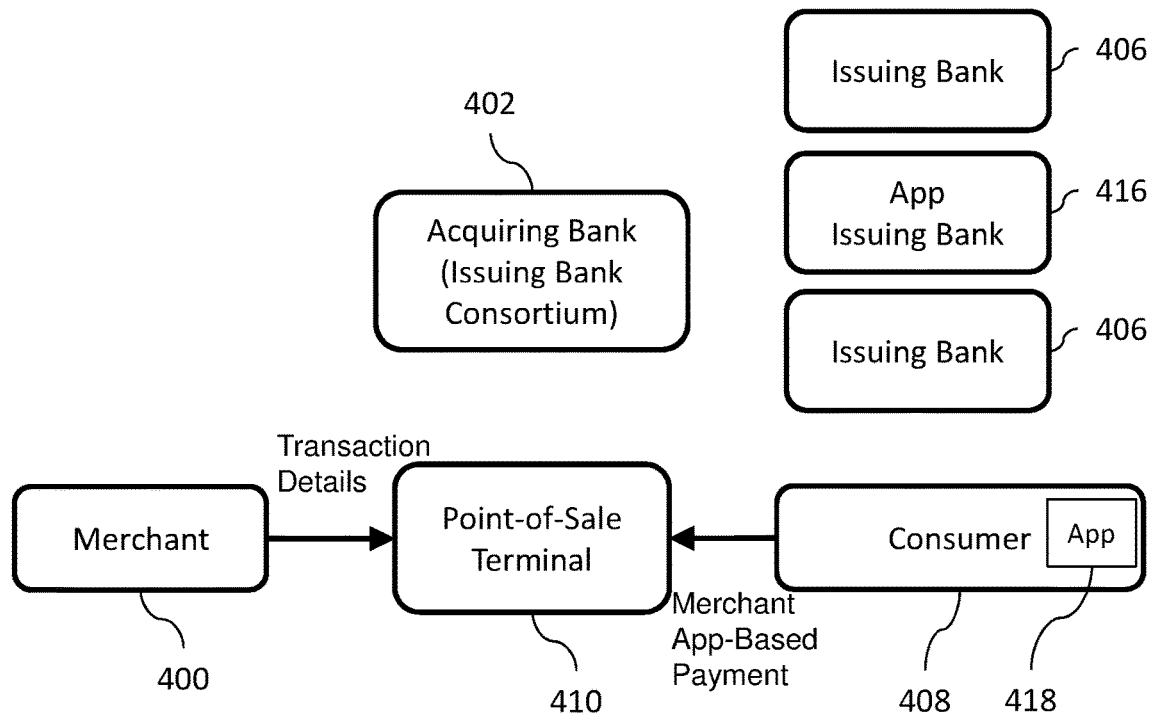
FIG. 31 is a schematic diagram illustrating systems used herein.
Figure 32:
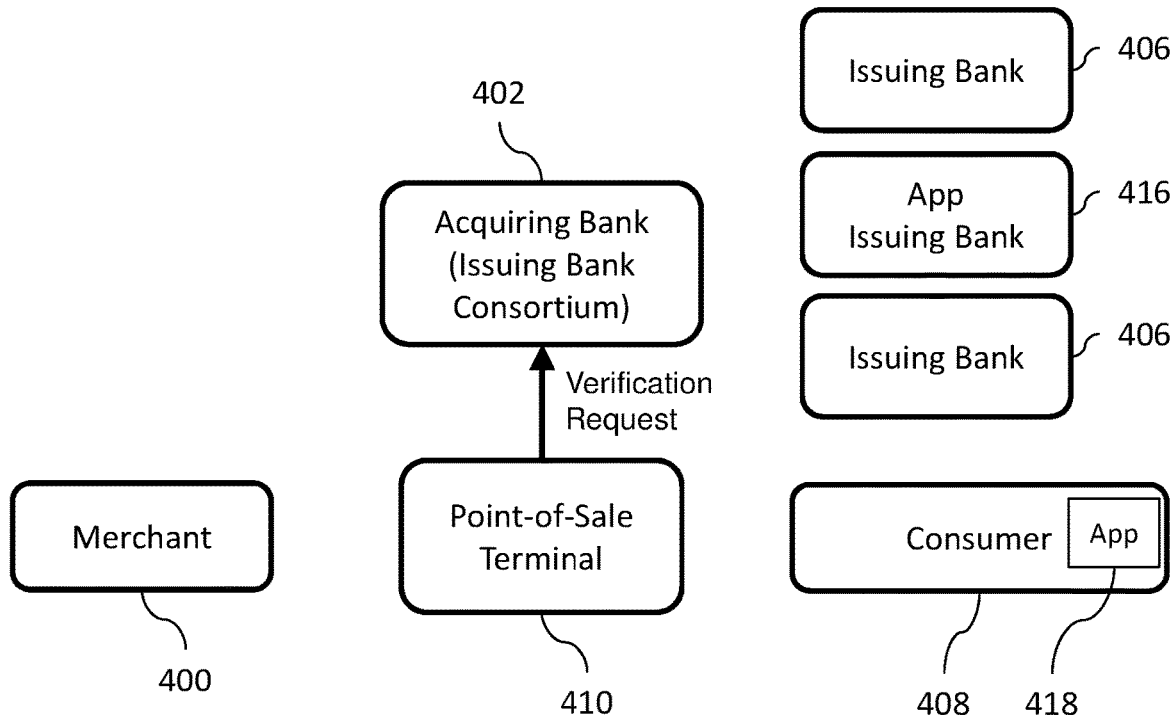
FIG. 32 is a schematic diagram illustrating systems used herein.

As shown in FIG. 31, the provider device 400 and the user device 408 independently supply the encrypted one-time-use provider code and the encrypted one-time-use user code to the point-of-sale device 410. As shown in FIG. 32, the point-of-sale device 410 transmits the encrypted one-time-use provider code and the encrypted one-time-use user code to the consortium device 402 as a verification request.

Figure 33:
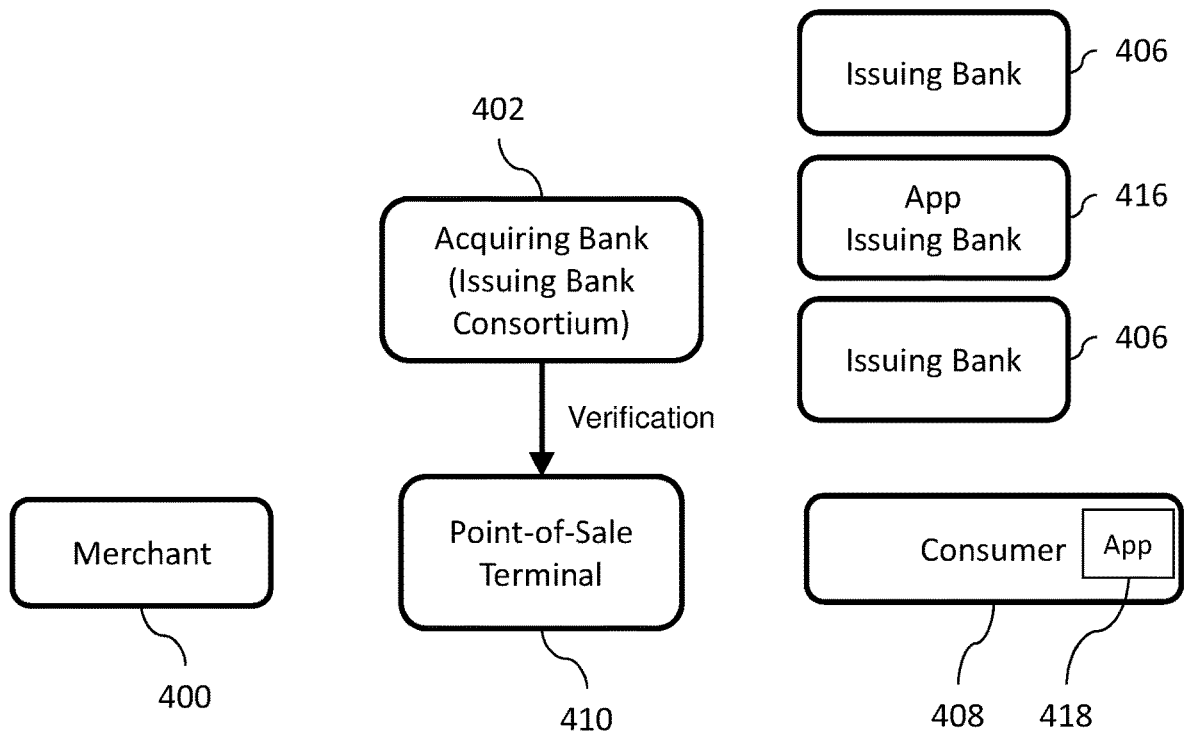
FIG. 33 is a schematic diagram illustrating systems used herein.
Figure 34:
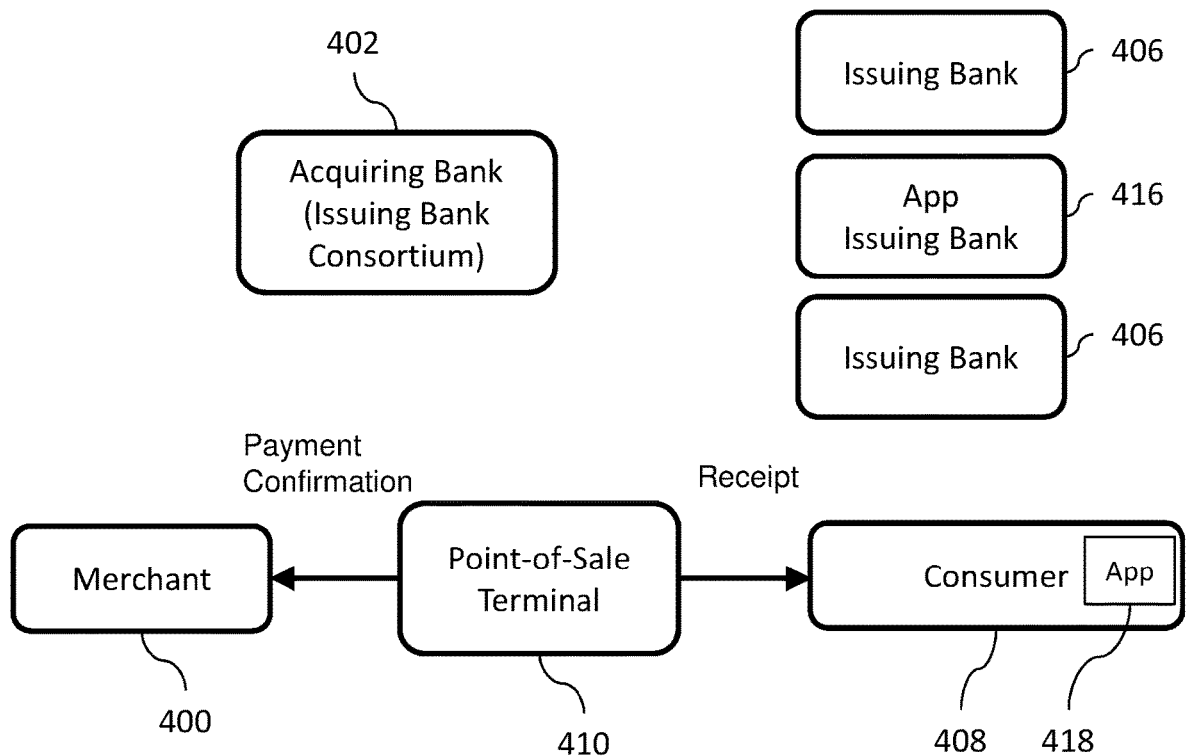
FIG. 34 is a schematic diagram illustrating systems used herein.

The consortium device 402 decrypts the encrypted one-time-use provider code and decrypts the encrypted one-time-use user code using one-time-use encryption keys (independently produced using corresponding ones of the duplicate sequencers maintained by the consortium device 402) to generating an authorization request of unencrypted provider input and unencrypted user input. The consortium device 402 generates an authorization decision in response to the authorization request, based upon the consortium device's 402 ability to verify the identity and intent of each party, and transmits the authorization decision to the point-of-sale device 410, as shown in FIG. 33. The point-of-sale device 410 in turn outputs the authorization decision to the provider device 400 and the user device 408, as shown in FIG. 34.

Thus, the paired user and provider one time use codes are decrypted, verified, and immediately cleared and finalized by the banks consortium 402, with the result ("approved" or "declined") being transmitted (immediately) to the provider/merchant 400, which provides a more streamlined version of the handling of transactions. This also allows an immediate reconciliation/clearing of transactions between the issuing and acquiring "consortium 402" member banks, simultaneous authorization of each verified payment transaction. This also provides for "clearing" of other types of financial transactions among and between the "consortium 402" member banks, such as check clearing, without any processing external to the computerized devices maintained by the bank consortium 402 (without transmitting any information or requests to intermediate clearing houses or external issuing banks). This also provides for similar provider apps for non-purchase transactions, such as verified access authorization. As noted above, the systems and methods herein can provide physical or electronic access to different physical or electronic items, in addition to approving purchase transactions. Therefore, with respect to providing access, whether for physical access to a restricted locale (room, building, etc.) or electronic access to a website, program, file, etc., the provider institution app also records (using, for example timestamps) when the user device electronically or physically accessed the item, and how long they accessed the item to which access was provided by the provider device (e.g., by time-stamping when the user device started accessing the electronic item (or entered the physical item) and when they stopped accessing the electronic item (or left the physical item). This provides increased security, verification and audit capabilities.

Figure 35:
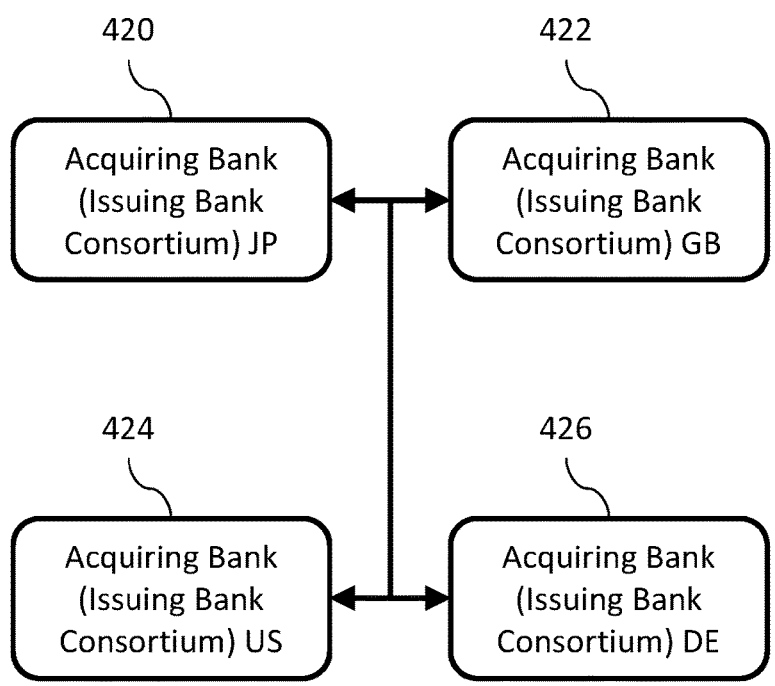
FIG. 35 is a schematic diagram illustrating systems used herein.

As shown in FIG. 35, different geographic regions (e.g., different countries) can each have their own independent bank consortium. Therefore, FIG. 35 illustrates different bank consortium examples, including a Japan (JP) bank consortium 420, a United Kingdom (GB) bank consortium 422, a United States (US) bank consortium, and a German (DE) bank consortium 426, all electronically connected by way of wide area or local area computerized networks, and all operating according to an inter-consortium agreement between the different local geographic consortiums. Therefore, if a user of the systems and methods herein conducts a transaction with a provider located outside the user's domestic network, the provider's local geographic network (e.g., 420) can clear the transaction through (e.g., can "inter bank") the user's one-time-use code to the user's local geographic network (e.g., 422) for immediate verification (or non-approval). This, in turn, supports international filing and a working relationship between the local geographic bank consortium groups shown in FIG. 35.

In view of the foregoing, in addition to the previously discussed data, an unencrypted consortium identification code is added to each party's one-time-use transaction code. The consortium identification code can be any convenient designation, such as each country's two-letter code (420 JP—Japan; 422 GB—United Kingdom; 424 US—United States of America; 426 DE—Germany, etc.) Thus, the encrypted one-time-use provider code and the encrypted one-time-use user code supplied to the point-of-sale device 410 in FIG. 31 (discussed above) can include the consortium identification code. This, in turn, allows the provider's bank or consortium to transmit the user's portion of a transaction from the provider's local geographic consortium to the user's local geographic consortium for verification.

With respect to FIG. 35, in one example a customer who is a member of the US consortium 424 may be physically in Germany or conducting a transaction with a provider in Germany, and may select a specific credit card for payment using the provider institution app 418 on their smartphone for payment to the German provider (who in this example is a member of the German consortium 426). The German consortium 426 receives the encrypted one-time-use user code (see FIG. 32, discussed above) and recognizes the user's unencrypted consortium identification code "US" identifying the US consortium 424. The transaction is processed by the German consortium 426 transmitting the encrypted one-time-use user code to the US consortium 424 for verification, noting that the provider portion of the transaction has been verified by the German consortium 426. The US consortium 424 verifies (or not) the user-portion of the transaction and clears the transaction to the German consortium 426 (i.e., it either confirms and credits the transaction or rejects it). In this regard, the methods and systems herein allow the international network of bank consortiums (FIG. 35) to work as payment clearing houses for each other, where each network retains the responsibility for its members and their clients. This also provides a secure, efficient international network for commerce. Simply put, the country of origin designation allows the international bank consortiums to rely on each other and extend the reach of the systems and methods herein.

Figure 36:
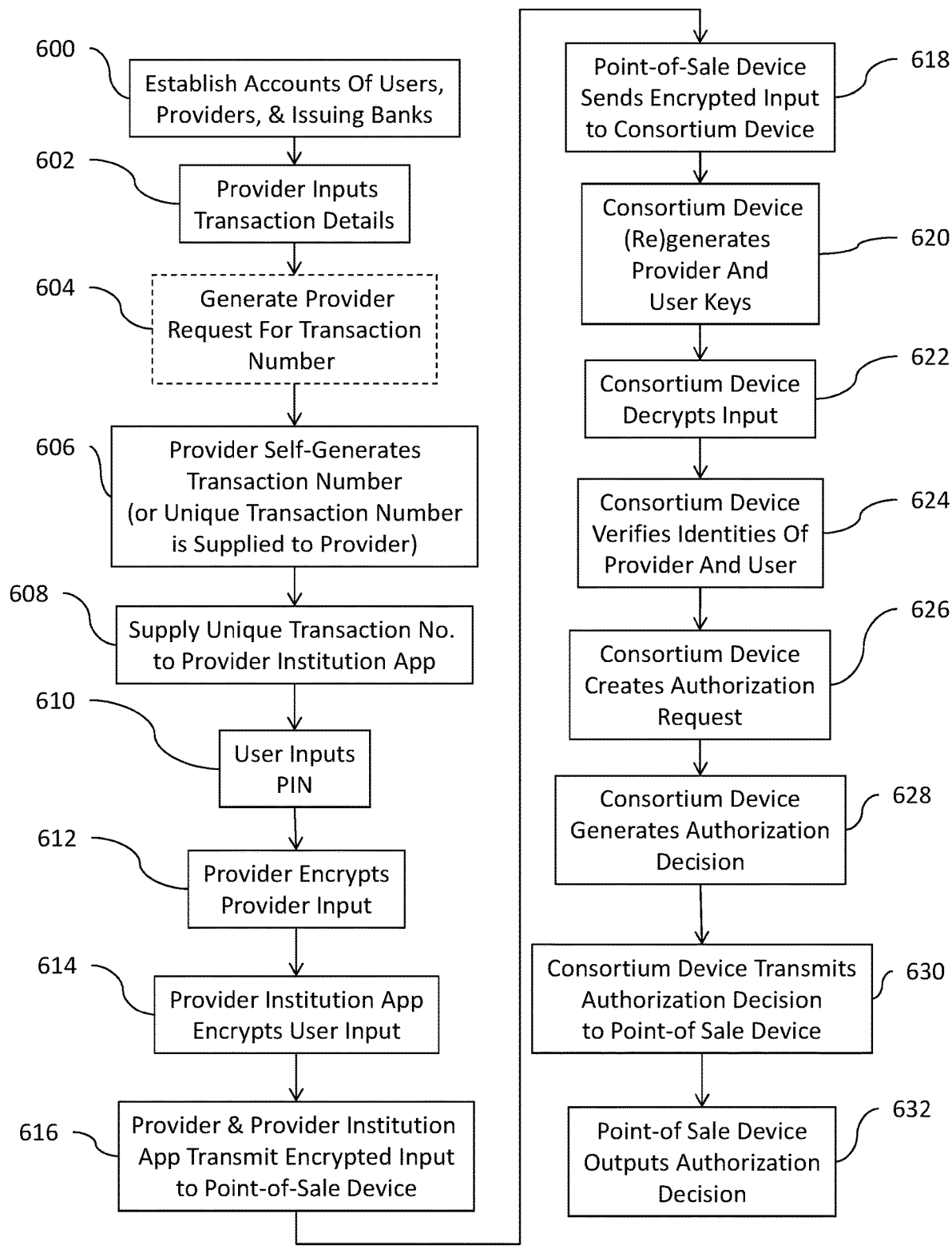
FIG. 36 is a flow diagram of various methods herein.

The processing of FIGS. 26-35 is also shown in flowchart form in FIG. 36. In item 600, these methods establish accounts of registered users through registered user devices and the provider institution app, accounts of registered providers through registered provider devices, and the financial institutions (issuing banks) register with the consortium device. With these methods, the consortium device securely maintains the personal financial information of the user, preventing the user device from maintaining such personal financial information. Also, with such methods, the consortium device maintains duplicate sequencers used in producing one-time-use encryption keys for the registered user devices and the registered provider devices.

In item 602, the provider inputs various details about the transaction (e.g., quantity, price, amount, terms and agreement as to terms of sale, access being requested, authorization being requested, etc.) into the application running on the provider device. In item 604, as an optional step (denoted by the dash-line box), a registered provider device can use its provider application to request a new transaction number for a new transaction between that provider and one of the registered users. Alternatively, in item 606, the provider app can self-generate a unique transaction number that the intermediate entity would expect (by way of the duplicate app to the provider app maintained by the intermediate entity).

Additionally, in such methods, the consortium device causes (e.g., through applications or apps) the provider device to supply a unique transaction number to the provider institution app operating on the user device in item 608. The provider device supplies a different unique transaction number for each different transaction. To execute item 608, the provider device can display a computer-readable code on a display of the provider device that is readable by an optical device of the user device; the provider device can display a human-readable code on the display of the provider device positioned to be readable by the user (where the user manually enters the human-readable code into the user device); the provider device can wirelessly transmit a code using a wireless device of the provider device capable of wirelessly communicating with a wireless device of the user device; the provider device can internally communicate the unique transaction number from the provider institution app operating on the user device to a second application operating on the user device; etc. The user device may also be a portable or wired device capable of storing the provider institution app, and accessing the provider device from a connected or non-wireless link.

In item 610, after receiving the code from the provider in item 608, the user can input a password or personal identification number (PIN) into the provider institution app running on the user device (or otherwise activate the transmission of the one-time-use code from the user's device to the provider's terminal, site, etc.). However, the inputting of a PIN by the user on the provider's device only provides an approximate "signature" acceptance to the terms; while, to the contrary, the one-time-use code generated by systems and methods herein is a verifiable signature that actually identifies and binds the parties to each transaction, and is therefore processed as person present, card verified, signature present and verified transaction, rather than as a card-not-present transaction. This allows the systems and methods herein to be used for in-person transactions by transmitting the one-time-use code, as a signal, to the bank consortium 402.

Further, in item 612, in such methods the consortium device causes the provider device to encrypt provider input related to the transaction to create an encrypted one-time-use provider code using a one-time-use provider encryption key produced, in part, using a uniquely sequenced number generated by a provider sequencer maintained by the provider device.

Similarly, in item 614, in these methods the consortium device causes (e.g., through the provider institution app) the user device, activated by the user, to encrypt user input related to the transaction to create an encrypted one-time-use user code using a one-time-use user encryption key produced, in part, using a uniquely sequenced number generated by a user sequencer maintained by the user device.

The user devices and the provider devices each only maintain a unique individual sequencer, and the user devices and the provider devices do not have access to sequencers of other user devices or other provider devices. The provider sequencer and the user sequencer therefore produce different encryption keys for the transaction. The provider sequencer and the user sequencer are synchronized with corresponding ones of the duplicate sequencers maintained by the consortium device. The provider sequencer, the user sequencer, and the duplicate sequencers produce different one-time-use encryption keys for each different transaction to prevent any one-time-use encryption key from being used for different transactions. The encrypted one-time-use provider code and the encrypted one-time-use user code are devoid of personal financial information of the user.

Further, in item 616, in such methods the provider device supplies the encrypted one-time-use provider code and the unique transaction number, and the provider institution app supplies the encrypted one-time-use user code and the unique transaction number only to the point-of-sale device. In item 618, the point-of-sale device transmits the encrypted one-time-use provider code, the unique transaction number, and the encrypted one-time-use user code to the consortium device.

Also, as shown in item 620, with such methods the consortium device independently generates the one-time-use provider encryption key and the one-time-use user encryption key using corresponding ones of the "duplicate sequencers" maintained by the consortium device. Then, in item 622, the consortium device decrypts the encrypted one-time-use provider code using the one-time-use provider encryption key and decrypts the encrypted one-time-use user code using the user unique encryption key to generate unencrypted provider input and unencrypted user input. Each one-time-use code contains a sequence that does not need to be encrypted and does not change. This sequence identifies the paired "duplicate sequencers" maintained by the consortium device.

With the decrypted provider and user information, the consortium device can check the user and provider registration records to verify the identities of the provider and user, as shown in item 624. If any registration issues with the user or provider are discovered in item 624 (e.g., lapsed registration, incorrect additional identification information (such as alphanumeric codes, special names, user/provider device hardware identifiers, etc., discussed above), violation of user/provider terms, etc.) notifications can be sent to the user/provider, and the transaction can be immediately terminated.

If the identities of the user and provider are found to be proper in item 624, the consortium device combines the unencrypted provider input and unencrypted user input into an authorization request in item 626. With such methods, in item 628, the consortium device generates an authorization decision in response to the authorization request and transmits the authorization decision to the point-of-sale device in item 630. Next, in these methods, the point-of-sale device outputs the authorization decision to the provider device and the provider institution app operating on the user device in item 632.

As shown in FIG. 37, additional exemplary methods and systems herein limit access to Internet of Things (IoT) devices 702 that may maintain confidential owner identification information 708. The owner identification information 708 identifies at least one user 706 associated with the IoT device 702 and may be supplied by such a user 706 to the IoT device 702. The IoT device 702 may be connected to a requesting entity 704 directly, or over a computerized network 202. With such methods and systems, the IoT device 702 receives an access request 730 from the requesting entity 704.

In response to the access request 730, the IoT device 702 generates "IoT encryption key data" (independently of the requesting entity 704) by retrieving at least a portion of the IoT encryption key data from an IoT sequencer 710. The IoT sequencer 710 comprises a component of the IoT device 702. Similarly, the requesting entity 704 generates "requesting entity encryption key data" (independently of the IoT device 702) by retrieving at least a portion of the requesting entity encryption key data from a requesting entity sequencer 712. The requesting entity sequencer 712 similarly comprises a component of the requesting entity 704. The IoT sequencer 710 and the requesting entity 704 generate different encryption key data values from each other. Further, the IoT sequencer 710 and the requesting entity 704 may generate different encryption key data values each time the IoT sequencer 710 and the requesting entity 704 are requested to generate the encryption key data values.

With these methods and systems, the IoT device 702 encrypts IoT identification information and data of the access request 730 (independently of the requesting entity 704) to create an "encrypted one-time-use IoT access code" 732 by first combining at least a portion of the IoT identification information and the data of the access request 730, and then applying the IoT encryption key data through a data encryption process to the IoT identification information and the data of the access request 730.

Similarly, the requesting entity 704 encrypts the requesting entity 704 identification information and the data of the access request 730 (independently of the IoT device 702) to create an "encrypted one-time-use requesting entity access code" 734 by first combining at least a portion of the requesting entity identification information and the data of the access request 730, and then applying the requesting entity encryption key data through a data encryption process to the requesting entity 704 identification information 708 and the data of said access request 730.

The IoT device 702 transmits the encrypted one-time-use IoT access code 732 to a remote access control server 700 (independently of the requesting entity 704) over the computerized network 202 as a first half of an encrypted access request. Similarly the requesting entity 704 transmits the encrypted one-time-use requesting entity access code 734 to the remote access control server 700 (independently of the IoT device 702) over the computerized network 202 as a second half of the encrypted access request. Thus, the IoT device 702 transmits the encrypted one-time-use IoT access code 732 to the remote access control server 700 independently and separately of the requesting entity 704 transmitting the encrypted one-time-use requesting entity access code 734 to the remote access control server 700, such that the IoT device 702 and the requesting entity 704 independently and separately transmit different halfs of a single encrypted access request to the remote access control server 700.

The remote access control server 700 decrypts the different halfs of this single encrypted access request by independently generating the IoT encryption key data (by retrieving at least a portion of the IoT encryption key data from a duplicate IoT sequencer 714, where the duplicate IoT sequencer 714 comprises a component of the remote access control server 700) and by applying the IoT encryption key data through a data decryption process to the encrypted one-time-use IoT access code 732 to produce the previously encrypted portion of the IoT identification information and the data of the access request 730. Similarly, the remote access control server 700 independently generates the requesting entity encryption key data (by retrieving at least a portion of the requesting entity encryption key data from a duplicate requesting entity sequencer 716, where the duplicate requesting entity sequencer 716 comprises a component of the remote access control server 700) and by applying the requesting entity encryption key data through a data decryption process to the encrypted one-time-use requesting entity access code 734 to produce the previously encrypted portion of the requesting entity 704 identification information and the data of the access request 730.

After performing the above decryption, the remote access control server 700 compares the portion of the IoT identification information, portion of the requesting entity 704 identification information, and the data of the access request 730 (decrypted from the encrypted one-time-use IoT access code 732 and from the encrypted one-time-use requesting entity access code) to validation data 718 of IoT identifications and requesting entity identifications maintained by the remote access control server 700. The remote access control server 700 identifies whether the encrypted one-time-use IoT access code 732 and the encrypted one-time-use requesting entity access code 734 are valid codes if the portion of the IoT identification information and the portion of the requesting entity 704 identification information match the validation data 718.

When there are such valid codes, the remote access control server 700 compares the data of the decrypted access request 730 to data of allowable requests 720, maintained by the remote access control server 700, to determine if the access request 730 is approved or disapproved (e.g., by matching the access request 730 to an allowable request in the data of allowable requests 720). Further, the remote access control server 700 transmits whether the access request 730 is approved or disapproved to the IoT device 702. The IoT device 702 therefore allows or denies access based on whether the access request 730 is approved or disapproved.

While some exemplary structures are illustrated in the attached drawings, those ordinarily skilled in the art would understand that the drawings are simplified schematic illustrations and that the claims presented below encompass many more features that are not illustrated (or potentially many less) but are commonly utilized with such devices and systems. Therefore, Applicant does not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted to allow the reader to focus on the salient aspects of the systems and methods described herein. Further, the terms automated or automatically mean that once a process is started (by a machine or a user), one or more machines perform the process without further input from any user.

It is appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, etc.

What is claimed is:

1. A system comprising:
    an intermediate entity, a first app, and a second app,
    said first app, operating on a first device, is capable of encrypting first input related to a transaction between said first device and a second device to create an encrypted first one-time-use code using a first one-time-use encryption key,
    said second app, operating on said second device, is capable of encrypting second input related to said transaction to create an encrypted second one-time-use code using a second one-time-use encryption key,
    said first one-time-use encryption key and said second one-time-use encryption key are different from one another and are different for each different transaction,
    said first app is capable of causing said first device to provide said encrypted first one-time-use code as an encrypted first half of said transaction to said intermediate entity, and said second app is capable of causing said second device to provide said encrypted second one-time-use code as an encrypted second half of said transaction to said intermediate entity, said intermediate entity is capable of decrypting said encrypted second one-time-use code and is capable of decrypting said encrypted first one-time-use code to produce a single authorization request for said transaction, said intermediate entity is capable of obtaining an authorization decision regarding said single authorization request for said transaction from an authorization entity, and said intermediate entity is capable of outputting said authorization decision.

2. The system according to claim 1, said intermediate entity comprises: a financial institution; a financial clearing house; a resource controller; and/or a verification entity, said second device comprises a device operated by: a merchant, a resource storage entity, an access control agent, and/or a communications entity, and said first device comprises a device operated by: a customer, a consumer, an organization, and/or an individual.

3. The system according to claim 1, said first device and said second device each only maintain a unique individual sequencer for producing said first one-time-use encryption key and said second one-time-use encryption key, and said first device and said second device do not have access to sequencers of other first device or other second device.

4. The system according to claim 1, said intermediate entity securely maintains personal financial information of a user operating said first device, and said first app prevents said first device from maintaining said personal financial information.

5. The system according to claim 1, said encrypted second one-time-use code and said encrypted first one-time-use code are devoid of personal financial information of a user operating said first device.

6. A system comprising:

an intermediate entity, a first app, and a second app, said second app, operating on a second device, is capable of encrypting second input related to a transaction between said second device and a first device to create an encrypted second one-time-use code using a second one-time-use encryption key, said second input includes a unique transaction number, said second app is capable of causing said second device to supply said unique transaction number to said first device, said first app, operating on said first device, is capable of encrypting first input related to said transaction to create an encrypted first one-time-use code using a first one-time-use encryption key, said first one-time-use encryption key and said second one-time-use encryption key are different from one another and are different for each different transaction, said first app is capable of causing said first device to provide said encrypted first one-time-use code as an encrypted first half of said transaction to said intermediate entity, and said second app is capable of causing said second device to provide said encrypted second one-time-use code as an encrypted second half of said transaction to said intermediate entity, said intermediate entity is capable of decrypting said encrypted second one-time-use code and is capable of decrypting said encrypted first one-time-use code to produce a single authorization request for said transaction, said intermediate entity is capable of obtaining an authorization decision regarding said single authorization request for said transaction from an authorization entity, and said intermediate entity is capable of outputting said authorization decision.

7. The system according to claim 6, said intermediate entity comprises: a financial institution; a financial clearing house; a resource controller; and/or a verification entity, said second device comprises a device operated by: a merchant, a resource storage entity, an access control agent, and/or a communications entity, and said first device comprises a device operated by: a customer, a consumer, an organization, and/or an individual.

8. The system according to claim 6, said first device and said second device each only maintain a unique individual sequencer for producing said first one-time-use encryption key and said second one-time-use encryption key, and said first device and said second device do not have access to sequencers of other first device or other second device.

9. The system according to claim 6, said intermediate entity securely maintains personal financial information of a user operating said first device, and said first app prevents said first device from maintaining said personal financial information.

10. The system according to claim 6, said encrypted second one-time-use code and said encrypted first one-time-use code are devoid of personal financial information of a user operating said first device.

11. A method comprising:

maintaining, by an intermediate entity, a first app, and a second app;

providing, by said intermediate entity, said first app to a first device, and said second app to a second device;

encrypting, by said first app, first input related to a transaction between a first device and a second device to create an encrypted first one-time-use code using a first one-time-use encryption key;

encrypting, by said second app, second input related to said transaction to create an encrypted second one-time-use code using a second one-time-use encryption key, said first one-time-use encryption key and said second one-time-use encryption key are different from one another and are different for each different transaction;

causing, by said first app, said first device to provide said encrypted first one-time-use code as an encrypted first half of said transaction to said intermediate entity;

causing, by said second app, said second device to provide said encrypted second one-time-use code as an encrypted second half of said transaction to said intermediate entity;

decrypting, by said intermediate entity, said encrypted second one-time-use code and said encrypted first one-time-use code to produce a single authorization request for said transaction;

obtaining, by said intermediate entity, an authorization decision regarding said single authorization request for said transaction from an authorization entity; and outputting, by said intermediate entity, said authorization decision.

12. The method according to claim 11, said intermediate entity comprises: a financial institution; a financial clearing house; a resource controller; and/or a verification entity, said second device comprises a device operated by: a merchant, a resource storage entity, an access control agent, and/or a communications entity, and said first device comprises a device operated by: a customer, a consumer, an organization, and/or an individual.

13. The method according to claim 11, said first device and said second device each only maintain a unique individual sequencer for producing said first one-time-use encryption key and said second one-time-use encryption key, and said first device and said second device do not have access to sequencers of other first device or other second device.

14. The method according to claim 11, further comprising:

securely maintaining, by said intermediate entity, personal financial information of a user operating said first device; and preventing, by said first app, said first device from maintaining said personal financial information.

15. The method according to claim 11, said encrypted second one-time-use code and said encrypted first one-time-use code are devoid of personal financial information of a user operating said first device.

16. A method comprising:

maintaining, by an intermediate entity, a first app, and a second app;

providing, by said intermediate entity, said first app to a first device, and said second app to a second device;

encrypting, by said second app, second input related to a transaction between a second device and a first device to create an encrypted second one-time-use code using a second one-time-use encryption key, said second input includes a unique transaction number;

causing, by said second app, said second device to supply said unique transaction number to said first device;

encrypting, by said first app, said unique transaction number and first input related to said transaction to create an encrypted first one-time-use code using a first one-time-use encryption key, said first one-time-use encryption key and said second one-time-use encryption key are different from one another and are different for each different transaction;

causing, by said first app, said first device to provide said encrypted first one-time-use code as an encrypted first half of said transaction to said intermediate entity;

causing, by said second app, said second device to provide said encrypted second one-time-use code as an encrypted second half of said transaction to said intermediate entity;

decrypting, by said intermediate entity, said encrypted second one-time-use code and said encrypted first one-time-use code to produce a single authorization request for said transaction;

obtaining, by said intermediate entity, an authorization decision regarding said single authorization request for said transaction from an authorization entity; and outputting, by said intermediate entity, said authorization decision.

17. The method according to claim 16, said causing said second device to supply said unique transaction number to said first device comprising at least one of:

causing said second device to display a computer-readable code on a display of said second device readable by an optical device of said first device;

causing said second device to display a human-readable code on said display of said second device positioned to be readable by a user, said user entering said human-readable code into said first device;

causing said second device to wirelessly transmit a code using a wireless device of said second device capable of wirelessly communicating with a wireless device of said first device; and causing said second device to internally communicate said unique transaction number from a first application operating on said first device to a second application operating on said first device.

18. The method according to claim 16, said first device and said second device each only maintain a unique individual sequencer for producing said first one-time-use encryption key and said second one-time-use encryption key, and said first device and said second device do not have access to sequencers of other first device or other second device.

19. The method according to claim 16, further comprising:

securely maintaining, by said intermediate entity, personal financial information of a user operating said first device; and preventing, by said first app, said first device from maintaining said personal financial information.

20. The method according to claim 16, said encrypted second one-time-use code and said encrypted first one-time-use code are devoid of personal financial information of a user operating said first device.

* * * * *